United States Patent
Wang et al.

(10) Patent No.: US 11,366,944 B2
(45) Date of Patent: Jun. 21, 2022

(54) MODELING INTERIOR PERMANENT MAGNET SYNCHRONOUS MACHINES CONSIDERING PERMEABILITY OF ROTOR

(71) Applicant: Mitsubishi Electric Research Laboratories, Inc., Cambridge, MA (US)

(72) Inventors: Bingnan Wang, Belmont, MA (US); Kyung-Hun Shin, Deajeon (KP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 117 days.

(21) Appl. No.: 17/000,551

(22) Filed: Aug. 24, 2020

(65) Prior Publication Data
US 2022/0058310 A1    Feb. 24, 2022

(51) Int. Cl.
*G06F 30/20*    (2020.01)
*G06F 17/12*    (2006.01)
(Continued)

(52) U.S. Cl.
CPC .............. *G06F 30/20* (2020.01); *G06F 17/12* (2013.01); *G06F 2111/10* (2020.01);
(Continued)

(58) Field of Classification Search
CPC ...... G06F 30/20; G06F 17/12; G06F 2111/10; H02K 1/276; H02K 21/042; H02K 21/16
See application file for complete search history.

(56) References Cited

U.S. PATENT DOCUMENTS

2008/0309366 A1* 12/2008 Zhou ................. G01M 13/04
                                                                    324/765.01
2020/0052557 A1*  2/2020 Rubin ................ H02K 11/028

FOREIGN PATENT DOCUMENTS

CN           104158458        1/2017
CN           107612256        1/2018
(Continued)

OTHER PUBLICATIONS

Shin KH, Jung KH, Cho HW, Choi JY. Analytical modeling and experimental verification for electromagnetic analysis of tubular linear synchronous machines with axially magnetized permanent magnets and flux-passing iron poles. IEEE Transactions on Magnetics. Jun. 27, 2018;54(11):1-6. (Year: 2018).*

(Continued)

*Primary Examiner* — Chuen-Meei Gan
(74) *Attorney, Agent, or Firm* — Gennadiy Vinokur; Hironori Tsukamoto

(57) ABSTRACT

A system for evaluating an electromagnetic performance of a permanent magnet (PM) motor. Parameters update an electromagnetic analytical (EA) model. Each component of the PM motor is associated with regions, and assumptions of the EA model include a relative permeability of regions associated with a rotor core modeled as finite. Calculate a general solution to a governing equation to each region which include unknown coefficients to be determined.
(Continued)

Define a set of boundary and interface (B&I) conditions for two neighboring regions, each B&I condition is defined through a set of Maxwell equations using the two neighboring regions sets of assumptions, geometries of the PM motor and electrical and magnetic properties associated with the two neighboring regions. All the unknown coefficients in the general solutions in all regions are solved with a linear system of equations obtained from the B&I conditions between the regions, to solve for a magnetic vector potential.

18 Claims, 18 Drawing Sheets

(51) Int. Cl.
| | |
|---|---|
| G06F 111/10 | (2020.01) |
| H02K 21/04 | (2006.01) |
| H02K 21/16 | (2006.01) |
| H02K 1/276 | (2022.01) |

(52) U.S. Cl.
CPC .......... *H02K 1/276* (2013.01); *H02K 21/042* (2013.01); *H02K 21/16* (2013.01)

(56) References Cited

FOREIGN PATENT DOCUMENTS

| | | |
|---|---|---|
| CN | 108631663 | 10/2018 |
| WO | 2020108411 | 6/2020 |

OTHER PUBLICATIONS

Roubache L, Boughrara K, Dubas F, Ibtiouen R. New subdomain technique for electromagnetic performances calculation in radial-flux electrical machines considering finite soft-magnetic material permeability. IEEE Transactions on Magnetics. Feb. 21, 2018; 54(4):1-5. (Year: 2018).*

Hanic A, Zarko D, Hanic Z. A novel method for no-load magnetic field analysis of saturated surface permanent-magnet machines using conformal mapping and magnetic equivalent circuits. IEEE Transactions on Energy Conversion. Dec. 31, 2015;31(2):740-9. (Year: 2015).*

Jabbari et al., "A New Subdomain Method for Performances Computation in Interior Permanent-Magnet (IPM) Machines" Iranian Journal of Electrical and Electronic Engineering 01 (2020) 26-38 Special Issue on Electrical Machines and Drives.

* cited by examiner

*(Aspects of some systems and methods begin with a topology of an IPMS machine to make simplifications for later analysis as detailed in FIG. 3)*

Table 1. Specification of analysis model.

| Variables | Values | Variables | Values |
|---|---|---|---|
| $r_0$ | 10 mm | $a$ | 9 deg. |
| $r_1$ | 20 mm | $b$ | 51 deg. |
| $r_2$ | 23 mm | $c$ | 3.37 deg. |
| $r_3$ | 25 mm | $d$ | 5.3 deg. |
| $r_4$ | 25.5 mm | $\mu_r^{III}$ | 2 |
| $r_5$ | 26.5 mm | $\mu_r^{IV}$ | 1000 |
| $r_6$ | 40.5 mm | $\omega_r$ | 1000 rpm |
| $r_7$ | 50 mm | $I_p$ | 25 A$_{peak}$ |

FIG. 6

(Analytical Model for
New type IPM Design)

MODELING INTERIOR PERMANENT MAGNET SYNCHRONOUS MACHINES CONSIDERING PERMEABILITY OF ROTOR

FIELD

The present disclosure relates generally to interior permanent magnet synchronous (IPMS) motors, and more particularly to evaluating electromagnetic performance including estimating an electromagnetic and loss analysis for the IPMS motors.

BACKGROUND

Conventional interior permanent magnet synchronous (IPMS) machines/motors are emerging in different industry applications due to having a small volume, light weight, low loss, high efficiency, high power density, and fast dynamic performance. However, when compared to surface-mounted permanent magnet (SMPM) machines, the complex IPMS machines rotor structures increase the difficulty of the design. It is challenging to describe IPMS machines/motors using an effective analytical model, such as an electromagnetic analysis model, because of the difficult-to-predict flux path in the rotor structure. Further, these analytical methods are important because they can be used as a way for understanding, designing, and sizing PM machines. For example, when designing PM machines to meet specific use requirements, incorporating optimization, and a shorten design cycle, one of the major challenges can be selecting the right electromagnetic analysis model to address the different machine design stages. If the electromagnetic analysis model is sufficiently accurate, the optimization of the design can deliver dependable PM machine parameters and thus the PM machine performance can be accurately predicted. However, the nonlinearity of the materials generates errors in the analytical model, i.e. electromagnetic analysis model. In Japanese Unexamined Patent Publication (Kokai) No. 2004-320864 and No. 2004-328944, there are described methods for controlling a magnetic field strength by changing magnetic resistance in a magnetic circuit including the field magnet. However, controlling the magnetic field strength can become difficult in a high-speed rotational region because the back electromotive force (power generation voltage) becomes too high, and therefore, various methods for weakening the field strength, as field-weakening control have been proposed, i.e. No. 2004-328944.

Analytical based approaches offer rapid analysis and can be useful in initial design evaluation and optimization. However, the structural complexity and nonlinearity of the rotor core make it difficult to define an analytical model for IPMS motor.

Accordingly, there is a need for apparatuses, methods and systems to consider the rotor permeability of IPMS motor, which enables the calculation of magnetic field in the core region, and provide a more accurate calculation of the electromagnetic performances such as flux linkage and electromagnetic forces, among other aspects.

SUMMARY

The present disclosure relates generally to interior permanent magnet synchronous (IPMS) motors, and more particularly to evaluating electromagnetic performance including estimating an electromagnetic and loss analysis for the IPMS motors.

Some embodiments of the present disclosure improve electromagnetic and losses analysis by considering a permeability of the rotor core of IPMS machine/motor. Based on identifying appropriate assumptions, a simplified analytical model can be configured for complex rotor structure and analytical solutions for each domain, i.e. region. In particular, in order to increase an accuracy of the analysis, a pole-piece and a bridge region is modeled in consideration of the rotor permeability. Wherein undetermined coefficients are calculated by applying boundary conditions in normal and tangential directions. By using the iteration method, the permeability of the rotor core is considered to ensure accuracy and validity of the analysis using an electromagnetic analysis model. From which, the analytical solutions, electromagnetic analysis and loss characteristics can be predicted. conventional analytical methods are limited to the calculation of only air-gap magnetic field, and cannot calculate the field of interior PM machines.

At least one realization of the present disclosure gained from experimentation is that in order to improve semi-analytical models based on a subdomain method for performance analysis of an interior permanent magnet synchronous machine, the pole-piece and the bridge region of the rotor needed to be modeled with finite permeability. This particular realization is contrast to conventional analytical methods and conventional thinking by those having the required skills within the analysis modeling arena, which assume that pole-piece and the bridge region of the rotor should be modeled with "infinite permeability". However, some aspects gained from experimentation is that unique assumption noted above, allows for a calculation of the magnetic field in the core region of the interior permanent magnet synchronous motor, and improves the accuracy of the motor electromagnetic performance calculation, as compared with conventional analytical approaches. Although it is desirable to be able to calculate the magnetic field distribution in the rotor core for more precise evaluation of an IPMS motor, some conventional approaches still exclude the calculation of core region by assuming "infinite permeability" of the core. The consideration of finite permeability values of the core adds a lot more complexity to the analytical modeling and calculation process. It is not obvious how to physically model the core region with a finite permeability value, and how to obtain the magnetic field solution mathematically. In some embodiments of the present disclosure, these approaches are designed to assign the pole piece and bridge region with finite and different permeability values in order to properly model the nonlinear effect of the core due to magnetic saturation. Additional boundary conditions between the two regions add complexity, and it is not straightforward of how to obtain closed form solution by matching these boundary conditions mathematically.

For example, the above analytical modeling technique is based on Fourier analysis where a total geometry is divided into separate regions. Within each region, an analytical solution is obtained by solving Maxwell equations in terms of a magnetic vector potential. A set of unknown coefficients is solved from a set of boundary conditions determined by the geometry of the problem. The analytical solutions for the electromagnetic characteristics derived will be utilized to develop a comprehensive analysis and a design process in IPMS motors.

Generally, some steps performed to analytically calculate the magnetic field distribution of an interior permanent magnet synchronous (IPMS) motor can include beginning with the analysis of defining parameters for an electromagnetic analysis from the analysis model or electromagnetic analysis (EA) model. The parameters can be provided from a motor design topology, where the geometrical and material parameters for each component can be extracted. Upon receiving the parameters, several assumptions need to be made to relatively simplify the solution of the problem and most importantly to make the analytic solution possible. For example, the assumptions of the EA model that are unique and are contrary to conventional analysis approaches and conventional thinking is assuming that a relative permeability of regions associated with a rotor core that are "finite". This particular unique assumption is new and novel over conventional thinking and conventional analysis model approaches, since conventional thinking assumes the relative permeability of regions associated with a rotor core are infinite, and exclude the core region from the calculation domain, as noted above.

A next step can include defining from the EA model and the above assumptions a simplified analytical model(s). Wherein the problem domain or region can be divided into a number of subdomains or regions, based on the assumptions, a geometry of the and the electrical and magnetic properties of each part of the IPMS motor. Then, based on Maxwell's equations and the assumptions made, the governing equations can be derived for each subdomain/region. Wherein a set of boundary and interface conditions can be defined based on the subdomains/regions and their geometry. In particular, this can include calculating a general solution to a governing equation to each region of the one or more regions of the PM motor with unknown coefficients to be determined, based on each region having a set of assumptions, geometry of the PM motor and electrical and magnetic properties of a component of the PM motor. Wherein, for each subdomain/region a general solution can be found to satisfy the governing equations and also has the potential to satisfy the boundary conditions. The boundary conditions are imposed to determine the integration constants of the general solutions. Thus, the electromagnetic performance analysis is performed based on the derived analytical solutions.

According to the embodiments of the present disclosure, the systems and methods can be utilized for many different industry applications including electric motors for hybrid electric vehicles (xEVs). Other industry applications for the systems and methods of the present disclosure can include robotics, drivetrains, wind turbines, elevators, compressors, air-conditioners, washing machines, etc. Some aspects as reasons why IPMS motors topologies are generally considered in many industry applications, is due to burying the permanent magnets (PMs), which makes possible to employ flux concentration. Another reason can be due to enclosing the PMs in steel strengthen the rotor structure and thereby allow operation at higher speeds. Yet, another reason is that an additional useful reluctance torque, resulting from the salient pole structure, gives the machine greater flux weakening capabilities.

In other words, the systems and methods of the present disclosure increased the accuracy and validity of the analysis for performance of the interior permanent magnet synchronous (IPMS) motors. In particular, due to the pole-piece and the bridge region of the rotor being modeled with finite permeability, in the electromagnetic analysis (EA) model. The systems and methods of the present disclosure increased the value of the applications for the above mentioned industries for PM motors, in particular, IPMS motors. Aspects of value provided by the systems and methods of the present disclosure provide faster calculation of magnetic fields over conventional numerical simulations, and provide aspects for geometry simplification, and give insights of relationships between performance and motor parameters. The EA models of the present disclosure provide instantaneous magnetic field calculation of electric motors, rapid design optimization, and real-time condition monitoring. As well as provide for optimization suggestions due to the motor performance that corresponded to a size of the motor.

Some more advantages and benefits of the embodiments of the present disclosure is that they can be utilized with conventional IPMS motors, as well as capable of analyzing other types of synchronous machines. For example, instead of using permanent magnet as the excitation source in the rotor, wound-field synchronous machine (WFSM) uses field coils in the rotor with DC current injection. When analyzing an IPMS motor, the PM region is considered as a subdomain with excitation source of the magnetization of the PM, and the magnetization is written in the form of a Fourier series. The solution of the governing equation is obtained by considering the excitation source. When analyzing a WFSM machine, the field coil region is considered as a subdomain with excitation source of the coil current, and the current excitation is written in the form of another Fourier series. The solution of the governing equation is obtained by considering the excitation source.

The embodiments of the present disclosure can be used with other types of machines, whereas conventional approaches cannot, for example, with IPMS machine, one drawback is that it is difficult to control the air gap magnetic flux, because the magnetic flux is determined by the property of the permanent magnet and is generally considered as constant and cannot be changed easily. Therefore, the efficiency of the machine can be affected as certain operating conditions. On the other hand, with WFSM, controlling the air gap magnetic flux is achieved by simply changing the current injection to the field coils. However, the copper loss of the field winding becomes large at the rated load.

A new type of synchronous machine combines the benefits of both IPMS and WFSM machines, and is called hybrid excitation synchronous machines (HESM). In an HESM, two excitation sources are present in the rotor, that is, both the magnetization of the PM, and the current in field coil in the rotor. The analysis of HESM is more complicated than conventional synchronous machines, due to its complexity in geometrical topology and the multiple excitation sources to deal with.

As noted above the embodiments of the present disclosure can be applied to different types of machines, including to the analysis of an HESM. A subdomain is assigned to the region of rotor with excitation sources, including the PM and the field coils. Each of the excitation source is written in the form of a Fourier series, and the solution of the governing equation for the subdomain is obtained considering both excitation sources.

Experimentation

Some test experimentation included the electromagnetic analyses for interior permanent magnet synchronous (IPMS) motors using various techniques, including magnetic equivalent circuit (MEC) networks and finite element (FE) methods. The MEC technique appeared to be simple for design optimization, however, what was later discovered is that accuracy suffered due to an oversimplification. The FE approach looked also appeared to be promising, but what was later discovered is that the FE approach was a time-consuming endeavor when every FE analysis model needed to be analyzed. Thus, both approaches were not further tested and such approached did not meet the goals of the present disclosure.

Some other test experimental hybrid models were tested, such as combining the FE method in iron material with an analytical solution in the air gap, however, what was later discovered is that this approach proved particularly challenging and all out generally difficult, to provide straightforward physical relationships between the machine performance and parameters.

Based upon the test experimentation is that analytical based approaches can be useful in initial design evaluation and optimization. However, the structural complexity and nonlinearity of the rotor core make it difficult to define an analytical model for interior permanent magnet synchronous (IPMS) motors.

According to another embodiment of the present disclosure, a system for designing an evaluation of an electromagnetic performance of a permanent magnet (PM) motor. The system including a transceiver to accept parameters for an electromagnetic analysis. A hardware processor in communication with the transceiver and the PM motor, to execute steps of an electromagnetic analytical (EA) model of the PM motor. The steps of the EA model includes updating the EA model with the parameters. Each component of the PM motor is associated with assumptions including some assumptions that relate to a relative permeability of regions associated with a rotor core that are modeled as finite. Calculate a general solution to a governing equation to each region of the regions of the PM motor that include unknown coefficients to be determined, based on each region having a set of assumptions, geometry of the PM motor and electrical and magnetic properties of a component of the PM motor. Identify a set of boundary and interface conditions for two neighboring regions of the regions, along with an additional boundary and interface condition between a barrier region and a neighboring pole-piece region that have different permeability values, and that their general solutions are matched at these boundary and interfaces. Calculate all the unknown coefficients in the general solutions in all regions of the PM motor based on solving a linear system of equations obtained from the boundary conditions between the regions, to solve for a magnetic vector potential for the PM motor. Evaluate the electromagnetic performance of the PM motor based on the magnetic vector potential for the PM motor.

Another embodiment of the present disclosure a system for designing an evaluation of an electromagnetic performance of a permanent magnet (PM) motor. The system including a transceiver to accept parameters for an electromagnetic analysis. A processor in communication with the transceiver and the PM motor, to execute steps of an electromagnetic analytical (EA) model of the PM motor. The steps of the EA model includes updating the EA model by inputting the parameters which updates a geometry of the PM motor and an electrical and magnetic properties for each component of the PM motor. Such that each component is associated with regions of the PM motor, and assumptions of the EA model include some assumptions with a relative permeability of regions associated with a rotor core that are modeled as finite. Calculate a general solution to a governing equation to each region of the regions of the PM motor that include unknown coefficients to be determined, based on each region having a set of assumptions, geometry of the PM motor and electrical and magnetic properties of a component of the PM motor. Identify a set of boundary and interface conditions for two neighboring regions of the regions. Each boundary and interface condition is defined on a basis through a set of Maxwell equations using the two neighboring regions sets of assumptions, geometries of the PM motor and electrical and magnetic properties associated with the two neighboring regions, and also identify relationships of the unknown coefficients in the general solutions of the two neighboring regions. Wherein an additional boundary and interface condition between a barrier region and a neighboring pole-piece region have different permeability values, such that their general solutions are matched at these boundary and interfaces. Calculate all the unknown coefficients in the general solutions in all regions of the PM motor based on solving a linear system of equations obtained from the boundary conditions between the regions, to solve for a magnetic vector potential for the PM motor, which is used for evaluating the electromagnetic performance of the PM motor.

Another embodiment of the present disclosure a method designing an evaluation of an electromagnetic performance of a permanent magnet (PM) motor. The method including receiving parameters for an electromagnetic analysis from an input interface. Using a hardware processor to execute steps of an electromagnetic analytical (EA) model for PM motor. The steps of the EA model include inputting the parameters into the EA model to updated the EA model. Wherein the updating of the EA model include using the parameters to update a geometry of the PM motor and an electrical and magnetic properties of each component of the PM motor. Such that each component is associated with one or more regions of the PM motor. Wherein assumptions of the EA model include some assumptions with a relative permeability of regions associated with a rotor core that are modeled as finite. Calculating a general solution to a governing equation to each region of the one or more regions of the PM motor with unknown coefficients to be determined, based on each region having a set of assumptions, geometry of the PM motor and electrical and magnetic properties of a component of the PM motor. Identifying a set of boundary and interface conditions for two neighboring regions of the one or more regions. Each boundary and interface condition is defined on a basis through a set of Maxwell equations, using each region of the two neighboring regions set of assumptions, geometry of the PM motor and electrical and magnetic properties of the two neighboring regions, and identify relationships of the unknown coefficients in the general solutions of the two neighboring regions. Wherein an additional boundary and interface condition between a barrier region and a neighboring pole-piece region have different permeability values, such that their general solutions are matched at these boundary and interfaces. Calculating all the unknown coefficients in the general solutions in all regions of the PM motor based on solving a linear system of equations obtained from the boundary conditions between the regions, to solve for a magnetic vector potential for the PM motor used for evaluating the electromagnetic performance of the PM motor.

Another embodiment of the present disclosure, a non-transitory computer readable storage medium embodied thereon a program executable by a computer for performing a method, the method including designing an evaluation of an electromagnetic performance of a permanent magnet (PM) motor. A hardware processor in communication with a controller of a permanent magnet motor, or the controller, to execute steps of an electromagnetic analytical (EA) model of the motor. The steps of the EA model includes receiving parameters for an electromagnetic analysis. Inputting the parameters into the EA model to updated the EA model.

Wherein the updating of the EA model includes using the parameters to update a geometry of the PM motor and an electrical and magnetic properties of each component of the PM motor. Such that each component is associated with regions of the PM motor, and assumptions of the EA model include some assumptions that relate to a relative permeability of regions associated with a rotor core that are finite. Calculating a general solution to a governing equation to each region of the one or more regions of the PM motor with unknown coefficients to be determined, based on each region having a set of assumptions, geometry of the PM motor and electrical and magnetic properties of a component of the PM motor. Identifying a set of boundary and interface conditions for two neighboring regions of the one or more regions. Each boundary and interface condition is defined on a basis through a set of Maxwell equations, using each region of the two neighboring regions set of assumptions, geometry of the PM motor and electrical and magnetic properties of the two neighboring regions, and identify relationships of the unknown coefficients in the general solutions of the two neighboring regions. Wherein an additional boundary and interface condition between a barrier region and a neighboring pole-piece region have different permeability values, such that their general solutions are matched at these boundary and interfaces. Calculating all the unknown coefficients in the general solutions in all regions of the PM motor based on solving a linear system of equations obtained from the boundary conditions between the regions, to solve for an electromagnetic performance parameter including a magnetic vector potential for the PM motor, that is later used for calculating other electromagnetic performance parameters. Accessing standard electromagnetic performance parameters prestored in a memory of the hardware processer or the controller. The hardware processer or the controller comparing the calculated electromagnetic performance parameters with the standard electromagnetic performance parameters, and obtaining an evaluating result of the electromagnetic performance of the PM motor.

According to another embodiment of the present disclosure, a system for designing an evaluation of an electromagnetic performance of a permanent magnet (PM) motor. The system including a transceiver to accept parameters for an electromagnetic analysis. A hardware processor in communication with the transceiver and the PM motor, to execute steps of an electromagnetic analytical (EA) model of the PM motor. The steps of the EA model includes updating the EA model with the parameters. Each component of the PM motor is associated with assumptions including some assumptions with a relative permeability of at least one pole-piece region and at least one bridge region of a rotor core modeled as finite. Calculate a general solution to a governing equation to each region of the regions of the PM motor that include unknown coefficients to be determined, based on each region having a set of assumptions, geometry of the PM motor and electrical and magnetic properties of a component of the PM motor. Identify a set of boundary and interface conditions for two neighboring regions of the regions, along with an additional boundary and interface condition between a barrier region and a neighboring pole-piece region that have different permeability values, and that their general solutions are matched at these boundary and interfaces. Calculate all the unknown coefficients in the general solutions in all regions of the PM motor based on solving a linear system of equations obtained from the boundary conditions between the regions, to solve for a magnetic vector potential for the PM motor. Evaluate the electromagnetic performance of the PM motor based on the magnetic vector potential for the PM motor.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6 is a table illustrating some specification of an analysis model, according to some embodiments of the present disclosure;

DETAILED DESCRIPTION

The present disclosure relates generally to interior permanent magnet synchronous (IPMS) machines, and more particularly to evaluating electromagnetic performance including estimating an electromagnetic and loss analysis for the IPMS machines.

Figure 1A:
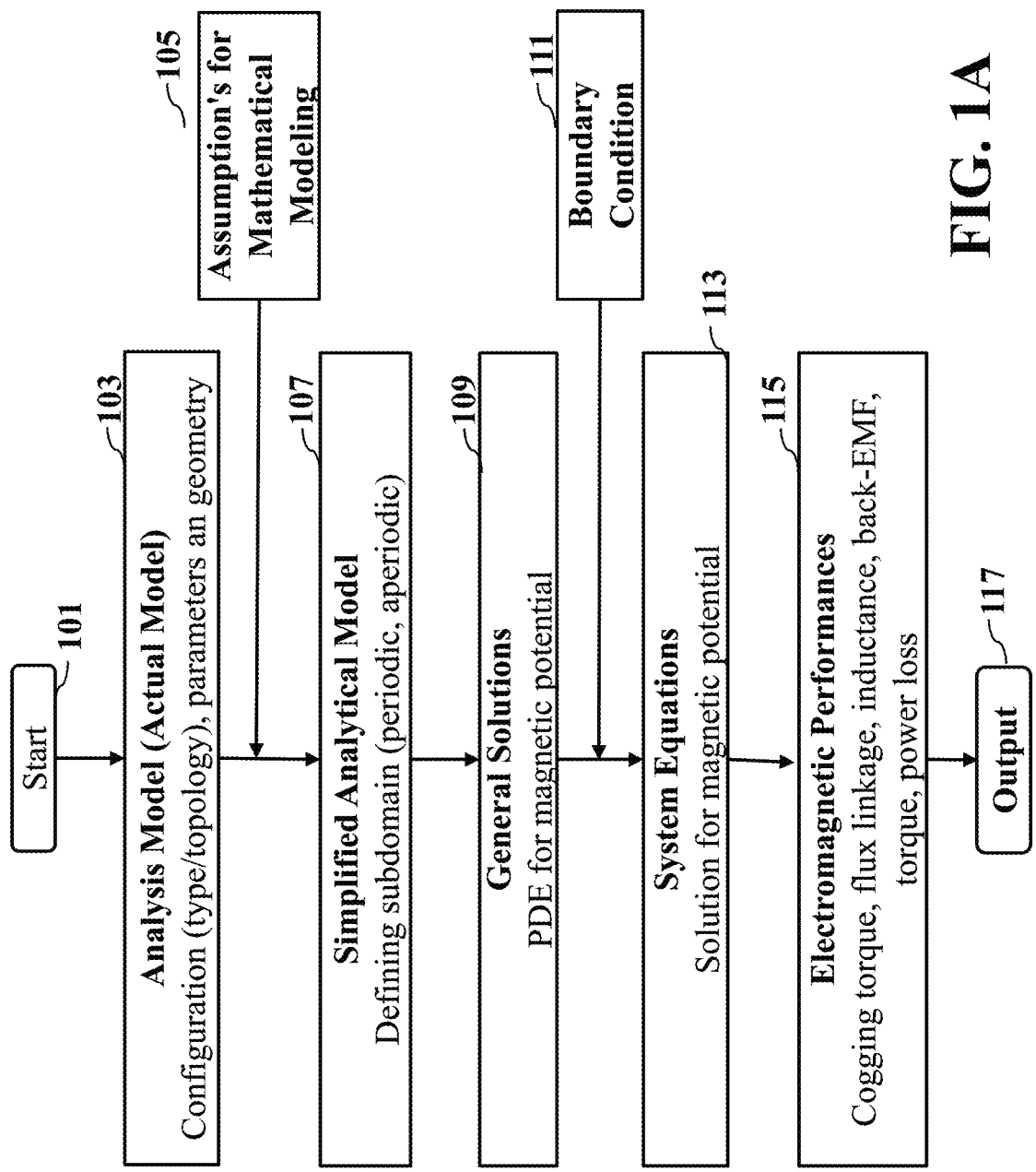
FIG. 1A is a block diagram illustrating some processes of analytical modeling for Interior permanent magnet synchronous (IPMS) machines considering saturation of rotor core, according to an embodiment of the present disclosure.

FIG. 1A is a block diagram illustrating some processes of analytical modeling for Interior permanent magnet synchronous (IPMS) machines considering saturation of rotor core, according to an embodiment of the present disclosure.

Some steps are performed to analytically calculate the magnetic field distribution of a PMSM include an initial step of starting 101 the process of analytical modeling for the IPMS machines, i.e. designing an evaluation of an electromagnetic performance of a permanent magnet (PM) motor. For example, parameters for an electromagnetic analysis are received via an input interface. The parameters, including the geometrical parameters and the material parameters of each component, can be provided from the motor design topology, which is provided by the motor designer or motor manufacturer. One or more hardware processors can be used to execute steps of an electromagnetic analytical (EA) model for PM motor. The EA model can be stored in a memory of the one or more hardware processors, and possibly stored in a cloud-based system and received via the network.

Step 103 of FIG. 1A includes the analysis to define parameters for the electromagnetic analysis from using the analysis model, i.e. an electromagnetic analysis model. For example, the received parameters are inputted into the EA model to updated the EA model. Wherein the updating of the EA model include using the parameters to update a geometry of the PM motor and an electrical and magnetic properties of each component of the PM motor, such that each component is associated with one or more regions of the PM motor.

Step 105 of FIG. 1A includes making some assumptions to relatively simplify the solution of the problem and most importantly to make the analytic solution possible. For example, the assumptions of the EA model can include some assumptions with a relative permeability of regions associated with a rotor core that are finite. These particular assumptions are new and novel over conventional thinking and conventional analysis model approaches, since conventional thinking assumes the relative permeability of regions associated with a rotor core are infinite.

Embodiments of the present disclosure provide unique aspects, including assigning the pole piece and bridge region with finite and different permeability values in order to properly model the nonlinear effect of the core due to magnetic saturation. For example, in the operation of an IPMS motor, the bridge region of the rotor core is often magnetically saturated, and the permeability of that region can vary depending on different operating conditions of the motor, due to the nonlinear magnetic property of the core material. With conventional thinking, by assuming infinite permeability of the rotor core, the region is excluded from the calculation model, therefore, the calculation accuracy suffers.

Although it is desirable to be able to calculate the magnetic field distribution in the rotor core for more precise evaluation of an IPMS motor, most conventional approaches still exclude the calculation of core region by assuming "infinite permeability" of the core. The consideration of finite permeability values of the core adds a lot more complexity to the analytical modeling and calculation process. It is not obvious how to physically model the core region with a finite permeability value, and how to obtain the magnetic field solution mathematically. As noted above, the present disclosure includes embodiments that assign the pole piece and bridge region with finite and different permeability values in order to properly model the nonlinear effect of the core due to magnetic saturation. Additional boundary conditions between the two regions add complexity, and it is not straightforward of how to obtain closed form solution by matching these boundary conditions mathematically.

Still referring to step 105, other assumptions can be adopted in the formulation of the analytical model, which can include, by-non-limiting example:

The relative permeability of the steel cores of the stator and rotor are infinite;
The relative permeability of the rotor bridge is constant;
The PMs have the same permeability as air which is equal to one;
Eddy-current effects are neglected;
End effects along the z-axis direction are neglected; and
The structure of stator and rotor have radial sides.

Step 107 of FIG. 1A includes a simplified analytical model that is defined using the electromagnetic analysis model and the assumptions of step 105. Wherein the problem domain, i.e. region, is divided into a number of subdomains, i.e. regions, based on the assumptions, the geometry of the machine and the electrical and magnetic properties of each part of the machine. Note, that throughout the specification the subdomains may be referred to as "regions". The regions can include:

Region I, a rotor core region;
Region II, a permanent magnet (PM) region;
Regions III, j-th barrier regions;
Regions VI, j-th pole-piece regions;
Regions V, air-gap regions;
Regions VI, ith slot-opening regions;
Regions VII, i-th bottom slot regions; and
Regions VIII, i-th top slot regions.

wherein Regions I, II, and V have periodic shapes. Further, aspects of Region III and Region IV, can include: (a) the surface of rotor core is susceptible to magnetic saturation;

(b) (b) there is a nonlinear relationship of the magnetic field (H) and the magnetic flux density (B) that follows the B-H curve of the core material (c) the magnetic flux density will not increase linearly at high magnetic field, and (c) that the permeability value of the material will reduce when saturation happens.

In particular, step 107 includes calculating a general solution to a governing equation to each region of the one or more regions of the PM motor with unknown coefficients to be determined, based on each region having a set of assumptions, geometry of the PM motor and electrical and magnetic properties of a component of the PM motor.

Step 109 of FIG. 1A includes based on Maxwell's equations and the assumptions made, the governing equations are derived for each subdomain or region.

Step 111 of FIG. 1A includes a set of boundary and interface conditions defined based on the subdomains, i.e. regions, and their geometry. Such that, for each subdomain a general solution can be found to satisfy the governing equations and also has the potential to satisfy the boundary conditions. Boundary conditions are imposed to determine the integration constants of the general solutions.

For example, step 109 defines a set of boundary and interface conditions for two neighboring regions of the one or more regions, each boundary and interface condition is defined on a basis through a set of Maxwell equations, using each region of the two neighboring regions set of assumptions, geometry of the PM motor and electrical and magnetic properties of the two neighboring regions, and identify relationships of the unknown coefficients in the general solutions of the two neighboring regions. Wherein an additional boundary and interface condition between a barrier region and a neighboring pole-piece region have different permeability values that create the additional boundary condition and interface condition that have to be matched, which means that their general solutions have to be matched at these boundary and interfaces.

Step 113 of FIG. 1A includes assembling a linear system of equations obtained from the boundary conditions and solving for the unknown coefficients in the magnetic vector potential solutions. For example, step 113 includes calculating all the unknown coefficients in the general solutions in all regions of the PM motor based on solving a linear system of equations obtained from the boundary conditions between the regions, to solve for a magnetic vector potential for the PM motor used for evaluating the electromagnetic performance of the PM motor. In another words, each region of all the regions includes a solution that is obtained by satisfying both the governing equations and the boundary conditions, such that the boundary conditions are imposed to determine integration constants of the solutions.

Step 115 of FIG. 1A includes electromagnetic performance analysis that is performed based on derived analytical solutions of magnetic vector potential. In particular, the systems and methods can accurately calculate electromagnetic performance parameters, such as the magnetic flux density of the air gap, the flux linkage between PM and stator windings, the back-EMF, the generated electromagnetic torque, the cogging torque, imbalance force on the basis of the magnetic field distribution, using the magnetic vector potential.

Step 117 of FIG. 1A includes outputting the magnetic vector potential, i.e. an electromagnetic performance parameter, for the PM motor to a display, an operator, or management system associating with designing or operating the PM motor(s).

In regard to the flux linkage, the flux linkage is based on a magnetic flux that is a product of a magnetic flux density times a perpendicular area that the magnetic flux penetrates. Wherein the calculating of the magnetic flux can use the magnetic vector potential which can be characterized as a line integral of the magnetic vector potential based on Stoke's theorem. Another electromagnetic performance parameter can be for predicting a back electromotive force (EMF), such that the back EMF that is a voltage that arises from conductors moving in a magnetic field or from changing magnetic fields in the PM motor, and wherein the magnetic field is represented by a flux linkage.

Figure 1B:
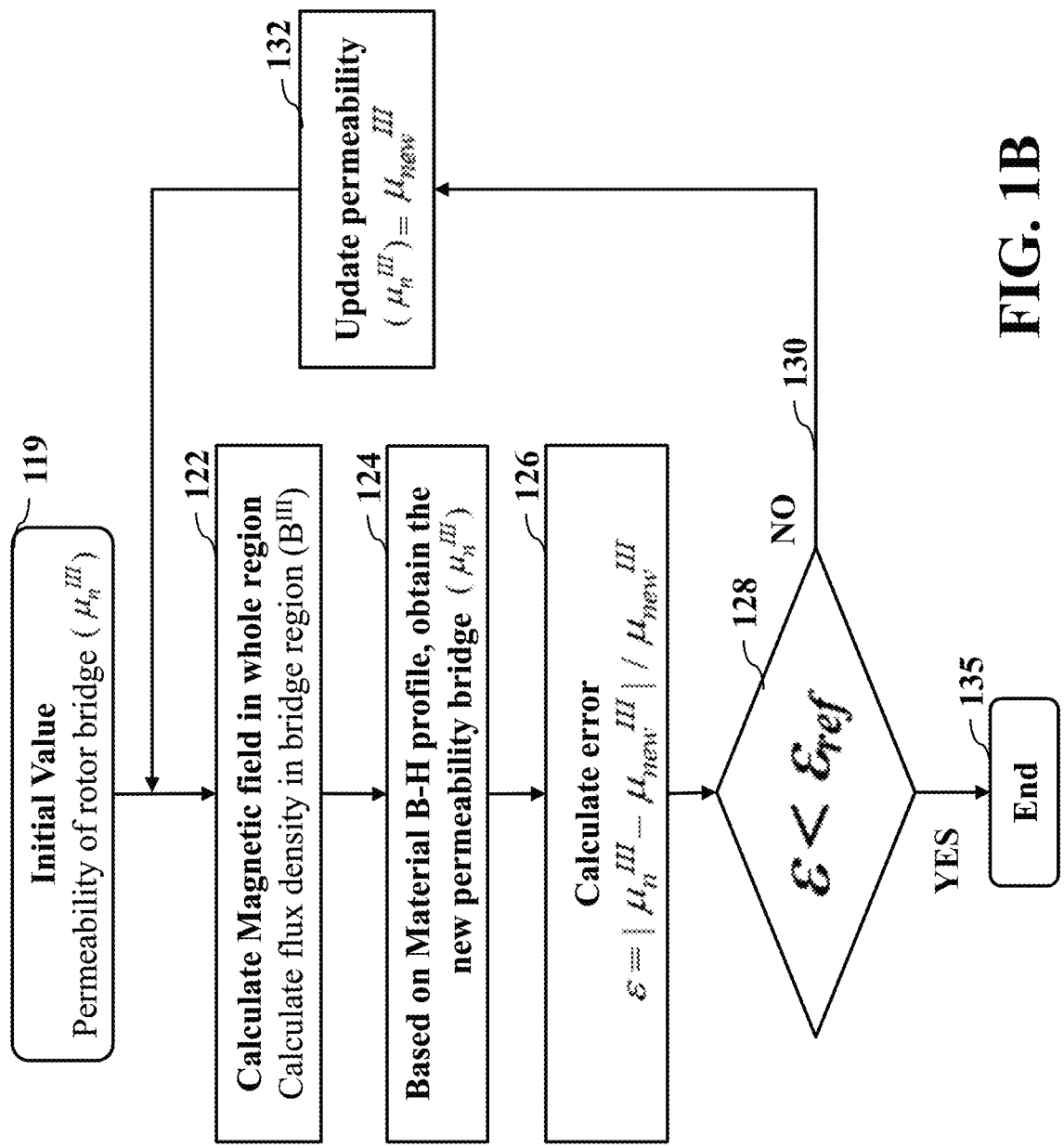
FIG. 1B is a flow diagram illustrating some processes of iteratively updating the permeability of the bridge region of the rotor core, based on the nonlinear relationship of magnetic flux density B and magnetic field strength H, due to magnetic saturation of the region, according to an embodiment of the present disclosure.

FIG. 1B is a flow diagram illustrating some processes of iteratively updating the permeability of the bridge region of the rotor core, based on the nonlinear relationship of magnetic flux density B and magnetic field strength H, due to magnetic saturation of the region, according to an embodiment of the present disclosure.

In step 119, an initial permeability value, assuming no saturation, is assigned to the bridge region. The assigned permeability value is send to calculation step 109 and used for subsequent calculation steps through step 117. Then the magnetic flux density B in the bridge region can be obtained from the process at step 122. Based on the material's property of B-H relation, the constitutive relation of $B=\mu H$, and the calculated B value, we can obtain the new permeability value of the region, in step 124. In step 126, we calculate the relative error of the permeability value, and compare the error with a preset threshold value in step 128. If the permeability error is below the threshold, the system assumes the calculation is accurate enough, and the calculation is finished in step 135. If the error is above the threshold, the new permeability value is updated for the region to replace the previous permeability value in step 132, and we go back to step 122 to conduct the calculation again.

Figure 2:
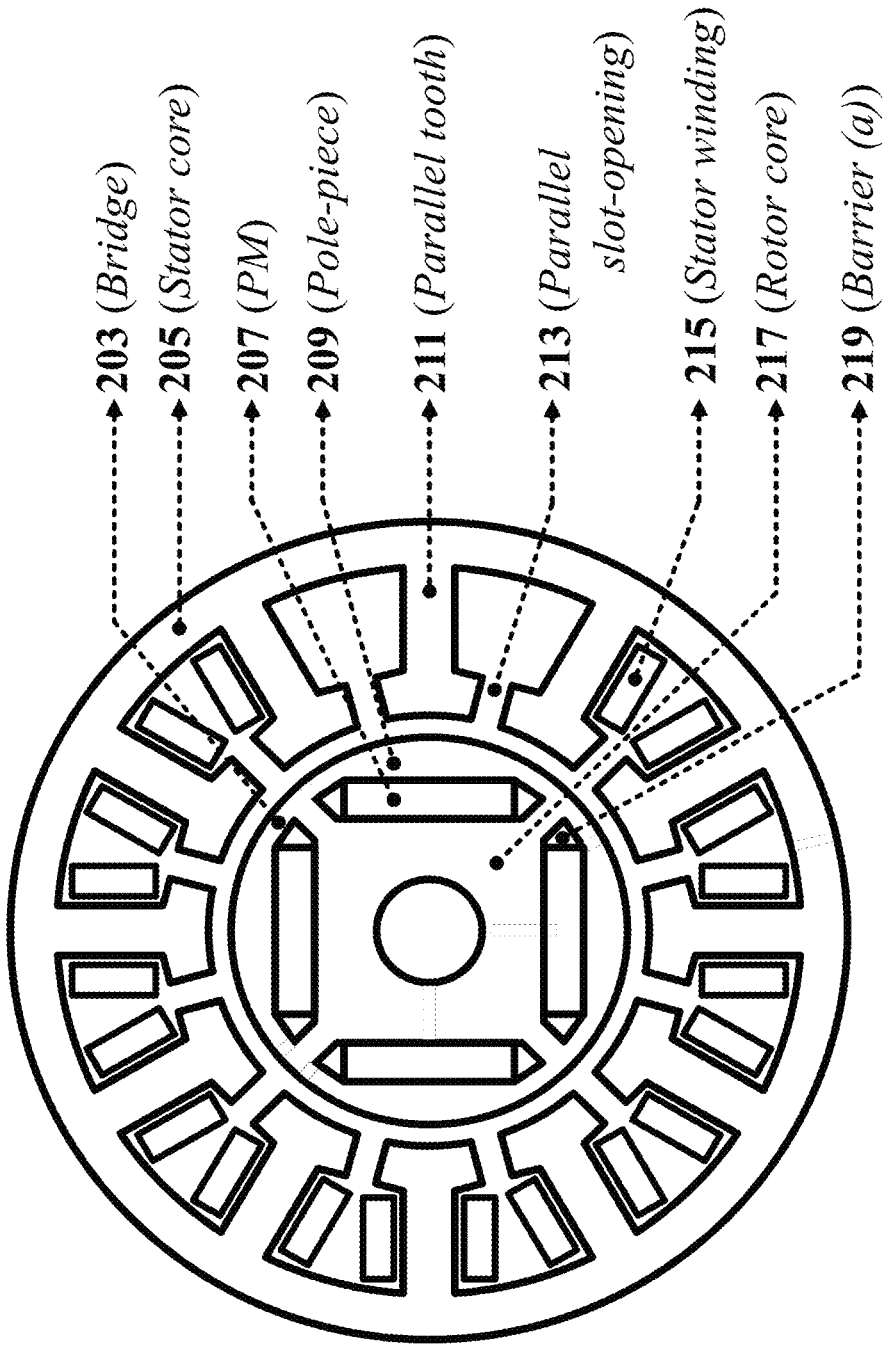
FIG. 2 is a schematic illustrating a structure of an IPMS machine, such that aspects of the systems and methods begin with a topology to make simplifications for later analysis as detailed in FIG. 3, according to some embodiments of the present disclosure.

FIG. 2 is a schematic illustrating a structure of an IPMS machine, including a stator structure of a parallel-tooth PM machine used in a model, the PM machine has a parallel tooth and slot opening design in a radial direction due to an effective flux path and large slot area, where modeling of a rotor for the IPMS machine with flat PM segments are analyzed by electromagnetic field theory, according to some embodiments of the present disclosure.

For example, the PM machine can have a parallel tooth and slot opening design in the radial direction due to the effective flux path and large slot area. While considering several assumptions for the magnetic and structural phenomenon, the modeling of the rotor for the IPMSM with flat PM segments can analyze by electromagnetic field theory. Firstly, the flux paths for the surface of the rotor by the PM are almost fixed regardless of the shape of the PM and barrier. Next, the saturated rotor bridge has a constant permeability. The saturated bridge has a low permeability close to that of air, which is determined by the B-H curve of material property.

Figure 3:
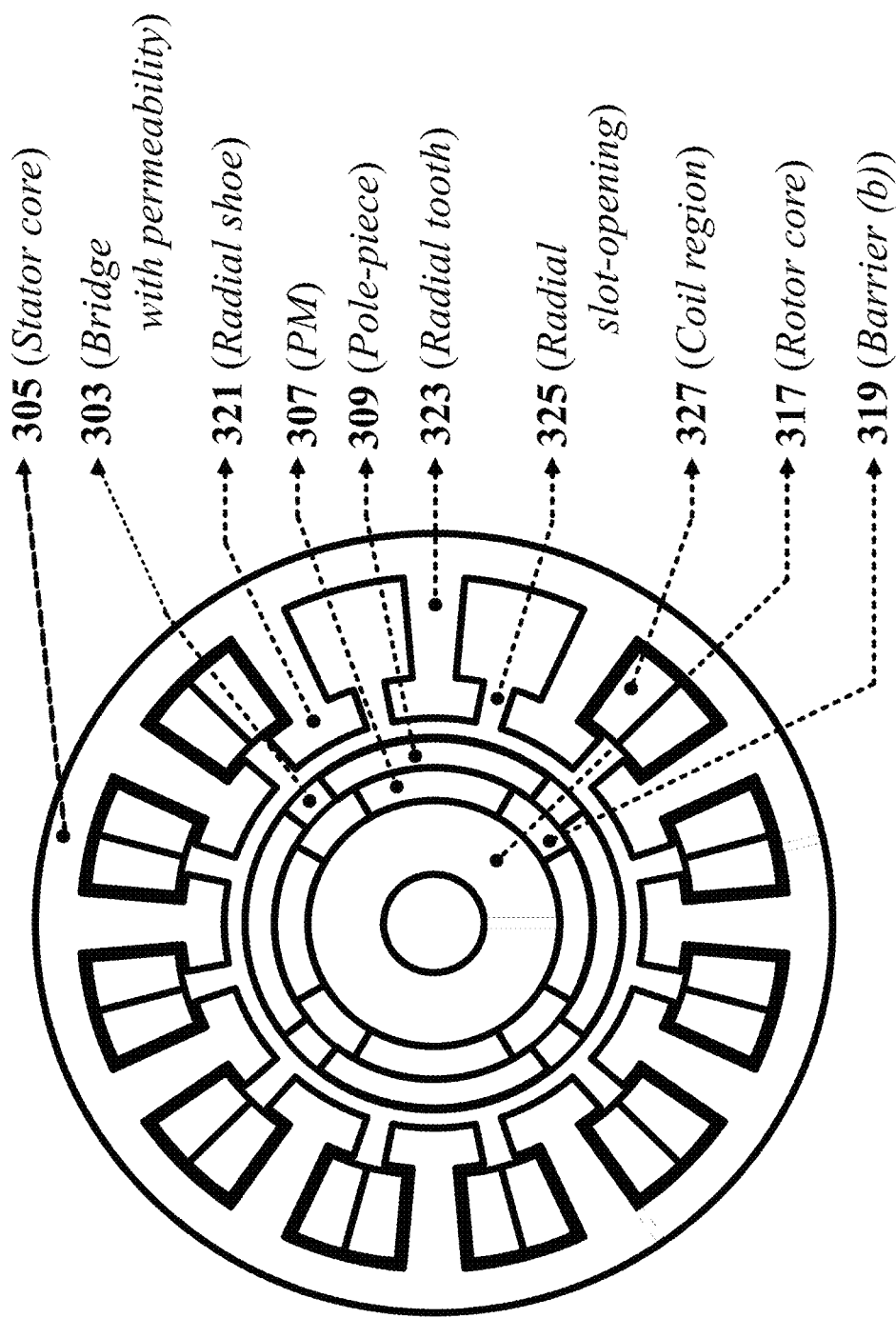
FIG. 3 is a schematic illustrating a simplified structure of an analytical model for an IPMS machine, according to some embodiments of the present disclosure.

FIG. 3 is a schematic illustrating a simplified structure of an analytical model for an IPMS machine, according to some embodiments of the present disclosure. For example, FIG. 3 shows the structure of the analytical model for the IPMSM, wherein all of the side walls of the analytical model are radially, and the area of the PM for the analytical model are same as the actual model.

Figure 4:
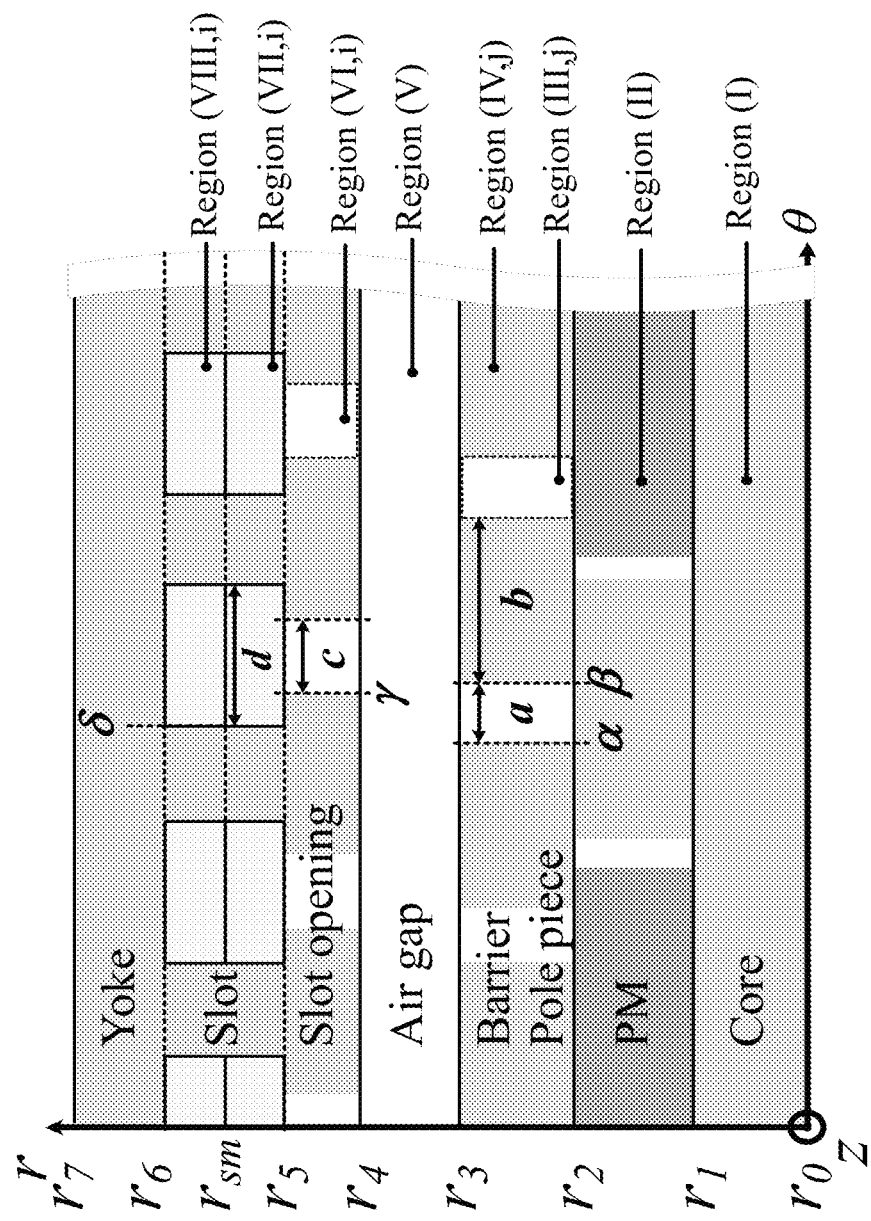
FIG. 4 is a schematic diagram illustrating determination of subdomain regions along with defining some main parameters of geometry of an IPMS machine, according to some embodiments of the present disclosure.

FIG. 4 is a schematic diagram illustrating determination of subdomain regions along with defining some main parameters of geometry of an IPMS machine, according to some embodiments of the present disclosure.

For example, the main parameters of geometry can be defined as follows:
the inner radius of the rotor core $r_0$;
the outer radius of the rotor core $r_1$;
the outer radius of the PM surface $r_2$;
the outer radius of the barrier $r_3$;
the inner and outer radii of the slot openings $r_4$ and $r_5$, respectively; and
the outer radius of the slot $r_6$. $r_{sm}=[(r_5^2+R_6^2)/2]^{1/2}$ so that the two parts of each slot have the same area.

The pole-arc-to-pole-pitch ratio of the rotor is a, the number of pole pairs is p, and the number of stator slots is Q with current flowing in each slot. The slot opening angle is c, the angle of the barrier is a, and the slot-pitch angle is d. The terms $\alpha_j$, $\beta_j$, $\gamma_i$, and $\delta_i$ are the angular positions of the j-th barrier, j-th pole-piece, i-th stator slot opening, and i-th stator slot, respectively, as follows:

$$\alpha_j = -\frac{a}{2} + \frac{\pi}{p}(j-1) + \theta_0 \quad \text{with } (\therefore 1 \le j \le 2p) \tag{1}$$

$$\beta_j = \alpha + a \quad \text{with } (\therefore 1 \le j \le 2p)$$

$$\gamma_i = -\frac{c}{2} + \frac{2\pi}{Q}(i-1) \quad \text{with } (\therefore 1 \le i \le Q)$$

$$\delta_i = \gamma - \frac{1}{2}(d-c) \quad \text{with } (\therefore 1 \le i \le Q)$$

where $\theta_0$ is the initial angular positions of the rotor.

The field problem domain is divided into a number of subdomains based on the assumptions, the geometry of the machine, and the electrical and magnetic properties of each part of the machine:
Region I (the rotor core subdomain),
Region II (the PM subdomain),
Regions III, j (j=1, 2, . . . , 2p) (the j-th barrier subdomains),
Regions IV, j (the j-th pole-piece subdomains),
Regions V (the air-gap subdomains),
Regions VI, i (i=1, 2, . . . , Q) (the i-th slot-opening subdomains),
Regions VII, i (the i-th bottom slot subdomains),
Regions VIII, i (the i-th top slot subdomains).

Regions I, II, and V have periodic shapes. The i-th simplified slot opening, the b-th simplified barrier, and the j-th simplified slot shapes are shown in FIG. 4. A magnetic vector potential is used owing to the presence of the current density distribution in the slots. A governing equation can be obtained using Maxwell's equation.

General Solutions of Analytical Model

The governing equations are obtained from $B=\mu_0(H+M)$, where B and H are the magnetic flux density and the magnetic intensity, respectively. The magnetic vector potential A is defined as $\nabla \times A = B$. The governing equation in the regions of rotor core (I), barrier (III, j), pole-piece (VI, j), slot-opening (VI, i) and air gap (V) are represented as Laplace's equation. In addition, the governing equations of the PM (II) and slot (VII, VIII) region are represented by Poisson's equation:

$$\nabla^2 A_z^I = 0 \quad \nabla^2 A_z^{II} = -\mu_0(\nabla \times M^{II})$$

$$\nabla_2 A_z^{III,j} = 0 \quad \nabla^2 A_z^{IV,j} = 0$$

$$\nabla^2 A_z^V = 0 \quad \nabla^2 A_z^{VI,i} = 0$$

$$\nabla^2 A_z^{VII,i} = -\mu_0 J^{VII,i} \quad \nabla^2 A_z^{VIII,i} = \mu_0 J^{VIII,i} \tag{2}$$

The subdomains in analytical model can be divided into two types: 1) periodic subdomain (i.e., air gap, shaft, and stator yoke) and 2) non-periodic subdomain (i.e., stator slots, buried PMs, and stator/rotor teeth). To solve the Laplace's equations in polar coordinates $(r, \theta)$ is by giving the general solutions of $A_z$ according to imposed BCs, viz.: 1) $A_z$ imposed in all edges of a region and 2) $B_r$ and $A_z$ are, respectively, imposed in r- and $\theta$-edges of a region. The solutions are derived from the principle of superposition.

According to the 2-D magneto-static general solution of (2), this can be derived using separation of variables method. In polar coordinate $(r, \theta)$, Laplace's equation can be written as $$\nabla^2 A^h = \frac{\partial^2 A_z}{\partial r^2} + \frac{1}{r}\frac{\partial A_z}{\partial r} + \frac{1}{r^2}\frac{\partial^2 A_z}{\partial \theta^2} = 0 \tag{3}$$

The vector potential has only z-components, which results in $A=R(r)\Theta(\theta)i_z$. Using the separation of variables method, the general solutions with homogeneous boundary condition of (3) can be given by:

$$A_z^h = (A_0 + B_0 \ln(r)) + \sum_{n=1} \left[ \begin{array}{l} (A_n(r)^{-n} + B_n(r)^n)\cos(n\theta) + \\ (C_n(r)^{-n} + D_n(r)^n)\sin(n\theta) \end{array} \right] i_z \tag{4}$$

where n is a harmonic number, and $A_0$, $B_0$, $A_n$, $B_n$, $C_n$, $D_n$, are the unknown coefficients.

The general solutions with non-homogeneous boundary condition of (3) can be given by:

$$A_z^h = (A_0 + B_0 \ln(r)) + \sum_{k=1}^{\infty}(A_k(r)^{-k_k} + B_k(r)^{k_k})\cos(k_k(\theta - \theta_1)) + \sum_{m=1}\left(A_m \frac{\sinh(k_m(\theta-\theta_1))}{\sinh(k_m\zeta)} + B_m \frac{\sinh(k_m(\theta-\theta_2))}{\sinh(k_m\zeta)}\right)\sin\left[k_m\ln\left(\frac{r}{r_i}\right)\right]i_z \tag{5}$$

where k and m are the harmonic number, and $k_k=k\pi/\zeta$ and $k_m=m\pi/\ln(r_o/r_i)$ are coefficients that depend on the radius of the subdomain, respectively. $r_i$ and $r_o$ are the inner and outer radii of the subdomain and z is angular width of the subdomain. $\theta_1$ and $\theta_2$ are initial and end angular position of the subdomain.

The particular solution should be added to general solution in source regions. Thus, the magnetic potential vector can be defined as follows:

$$A_z = A_z^h + A_z^p \tag{6}$$

The particular solution of PM subdomain can be expressed as follows.

$$A_z^{II,p} = \sum_{n=1}^{\infty} \frac{r\mu_0 n M_n}{((n)^2-1)}[\cos n\theta_0 \sin n\theta - \sin n\theta_0 \cos n\theta]i_z \tag{7}$$

where $M_n$ is defined as $M_n = M_{rn} - M_{\theta n}/n$, and $M_{rn}$ and $M_{\theta n}$ are the radial and circumferential components of the magnet magnetization, respectively.

The particular solution of stator coil subdomains can be expressed as follows.

$$A_z^{h,VII \text{ or } VIII} = -\frac{1}{4}\mu_0 J_0^{VII,VIII} r^2 i_z \quad (8)$$

where $J_0^{VII,VIII}$ is the components of the current density distribution, respectively.

By $\nabla \times A = B$, the flux density of the normal and tangential components can be calculated.

$$B_r = \frac{1}{r}\frac{\partial A_z}{\partial \theta} i_r \quad B_\theta = -\frac{\partial A_z}{\partial r} i_\theta \quad (9)$$

$J_0$ is the current density in the i th stator slot with i vary from 1 to Q in which Q represents the number of stator slots.

In order to calculate magnetic field distribution, $J_0^{VII}$ and $J_0^{VIII}$ is defined by $$J_0^{VII} = \frac{N_c}{S} C^{VII} [i_a \ i_b \ j_c] \quad (10)$$

$$J_0^{VIII} = \frac{N_c}{S} C^{VIII} [i_a \ i_b \ i_c] \quad (11)$$

where $S = c(r_6^2 - r_5^2)/2$ is the stator slot area, $N_c$ is the number of conductors in the stator slot, i· are the armature currents of three phases, and C is the winding connection matrix of the q-phases current and the stator slots which can be expressed in [15].

Figure 5:
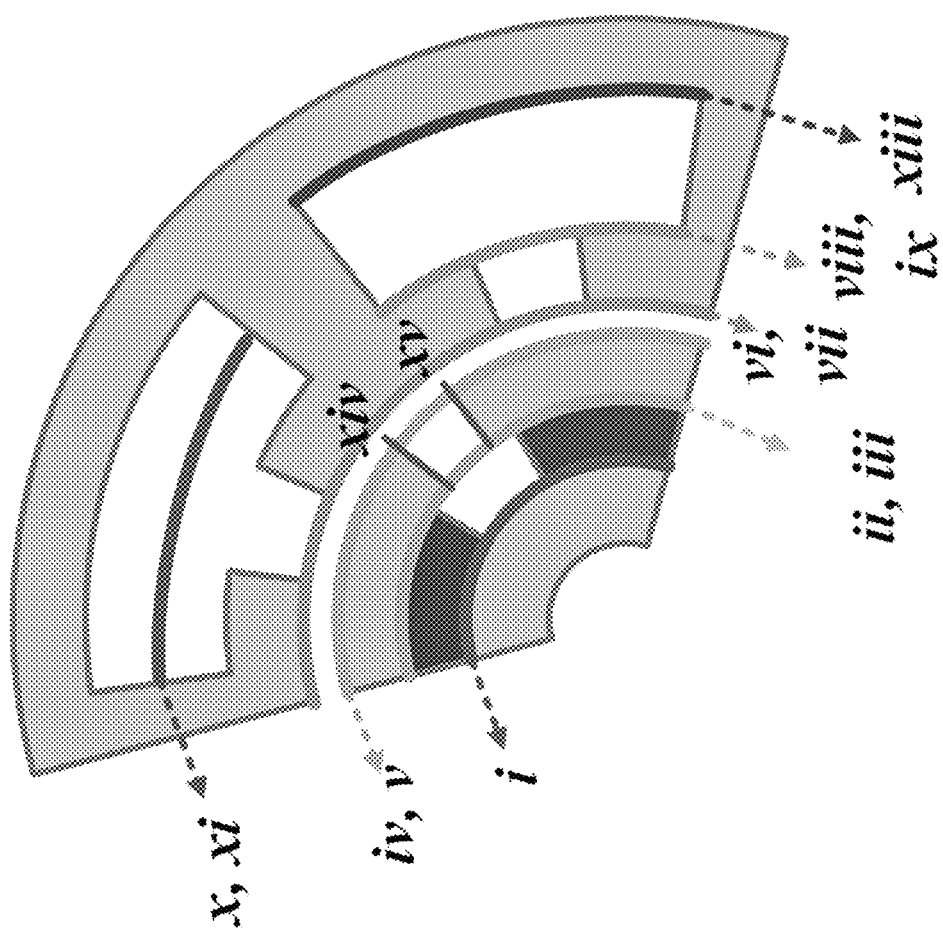
FIG. 5 is a schematic diagram illustrating boundary conditions of an analytical model of an IPMS machine, according to some embodiments of the present disclosure.

FIG. 5 is a schematic diagram illustrating boundary conditions of an analytical model of an IPMS machine, according to some embodiments of the present disclosure.

Boundary Conditions

Due to the proper choice of the solution form for the vector potential, the boundary conditions in the tangential direction are inherently satisfied:

First of all, Ampere's circuital law for the boundary is applied about a small closed path in a plane normal to the boundary surface. Without involving the current sheet, the tangential components of magnetic field intensity ($H_\theta$) on its two sides should be equal (Rule 1). Secondly, with Gauss's law for the magnetic field, the boundary condition on the normal components of flux density ($B_r$) is determined by allowing the surface to cut a small cylindrical Gaussian surface (Rule 2). Finally, the magnetic vector potential ($A_z$) at both interfaces is the same (Rule 3). The third rule is more mathematically more convenient than the second rule when calculating boundary conditions. Based on these rules, the boundary conditions for the analytical model are shown in FIG. 5.

By applying the boundary and interface conditions to the definition of the analytical solution and magnetic flux density of each region, the following equation is obtained:

$$i) r = r_1 : A_z^I(r_1, \theta) = A_z^{II}(r_1, \theta) \quad (12)$$

$$ii) r = r_1 : H_\theta^I(r_1, \theta) = H_\theta^{II}(r_1, \theta) \quad (13)$$

$$iii) r = r_2 : \quad (14)$$
$$A_z^{II}(r_2, \theta) = A_z^{III,j}(r_2, \theta) \quad \theta \in [\alpha_j, \alpha_j, a]$$
$$A_z^{II}(r_2, \theta) = A_z^{IV,j}(r_2, \theta) \quad \theta \in [\beta_j, \beta_j, b]$$

$$iv) r = r_2 : \quad (15)$$
$$H_\theta^{II}(r_2, \theta) = \begin{cases} H_\theta^{III,j}(r_2, \theta) & \theta \in [\alpha_j, \alpha_j, a] \\ H_\theta^{IV,j}(r_2, \theta) & \theta \in [\beta_j, \beta_j, b] \end{cases}$$

$$v) r = r_3 : \quad (16)$$
$$A_z^V(r_3, \theta) = A_z^{III,j}(r_3, \theta) \quad \theta \in [\alpha_j, \alpha_j, a]$$
$$A_z^V(r_3, \theta) = A_z^{IV,j}(r_3, \theta) \quad \theta \in [\beta_j, \beta_j, b]$$

$$vi) r = r_3 \quad (17)$$
$$H_\theta^V(r_3, \theta) = H_\theta^{III,j}(r_3, \theta) \quad \theta \in [\alpha_j, \alpha_j, a]$$
$$H_\theta^V(r_3, \theta) = H_\theta^{IV,j}(r_3, \theta) \quad \theta \in [\beta_j, \beta_j, b]$$

$$vii) r = r_4 : \quad (18)$$
$$A_z^{VI,i}(r_4, \theta) = A_z^V(r_4, \theta) \quad \theta \in [\gamma_i, \gamma_i + c]$$

$$viii) r = r_4 : \quad (19)$$
$$\frac{1}{\mu_0} B_\theta^V(r_4, \theta) = \sum_{i=1}^{Q} \begin{cases} \frac{1}{\mu_0} B_\theta^{VI,i}(r_4, \theta) & \theta \in [\gamma_i, \gamma_i + c] \\ 0 & \text{else} \end{cases}$$

$$ix) r = r_5 : \quad (20)$$
$$A_z^{VI,i}(r_5, \theta) = A_z^{VII,i}(r_5, \theta) \quad \theta \in [\gamma_i, \gamma_i + c]$$

$$x) r = r_5 : \quad (21)$$
$$\frac{1}{\mu_0} B_\theta^{VII,i}(r_5, \theta) = \begin{cases} \frac{1}{\mu_0} B_\theta^{VI,i}(r_5, \theta) & \theta \in [\gamma_i, \gamma_i + c] \\ 0 & \text{else} \end{cases}$$

$$xi) r = r_{sm} : \quad (22)$$
$$A_z^{VII,i}(r_{sm}, \theta) = A_z^{VIII,i}(r_{sm}, \theta)$$

$$xii) r = r_{sm} : \quad (23)$$
$$H_\theta^{VII,i}(r_{sm}, \theta) = H_\theta^{VIII,i}(r_{sm}, \theta)$$

$$xiii) r = r_6 : B_\theta^{VIII,i}(r_6, \theta) = 0 \quad (24)$$

$$xiv) \theta = \alpha_j + a = \beta_j : \quad (25)$$
$$A_z^{III,j}(r, \alpha_j + a) = A_z^{IV,j}(r, \beta_j)$$
$$H_r^{III,j}(r, \alpha_j + a) = H_z^{IV,j}(r, \beta_j)$$

$$xv) \theta = \alpha_{j+1} + \beta_j = b : \quad (26)$$
$$A_z^{III,j+1}(r, \alpha_{j+1}) = A_z^{IV,j}(r, \beta_j + b)$$
$$H_r^{III,j+1}(r, \alpha_{j+1}) = H_z^{IV,j}(r, \beta_j + b)$$

The solution in rotor core is derived by adding Dirichlet boundary condition of the magnetic potential vector at $r = r_0$, viz., $A_z(r_0, \theta) = 0$. The unknown coefficients can be determined by solving the following linear system (i.e., Cramer's system) obtained from the boundary conditions between various regions.

Electromagnetic Performances

Prediction of the analytical solutions [viz., flux linkage, back electromotive force (EMF), and electromagnetic torque] allows the electromagnetic performance evaluation of IPMSMs.

Flux Linkage

Magnetic flux is the product of the magnetic flux density times the perpendicular area that it penetrates.

$$\phi = \int_S B \cdot dS \quad (27)$$

In stator coil subdomain, the calculation of the magnetic flux can no longer be used with the winding function method used in the previous analytical method based on the sheet current. For calculation of magnetic flux using magnetic vector potential, it can be expressed as line integral of magnetic vector potential based on Stoke's theorem. To calculate the average value of the vector potentials of all slot region, it is assumed that the current is uniformly distributed in the slot region. The average result of the magnetic vector potential can be obtained by dividing the result of the surface integral calculation of the magnetic vector potential for the slot region by the slot area $$\phi^{VI,i} = l_{stk} \frac{N_c}{S} \int_{r_6}^{r_{sm}} \int_{\delta_i}^{\delta_i+d} A_z^{VI,i} r dr d\theta \qquad (28)$$

$$\phi^{VII,i} = l_{stk} \frac{N_c}{S} \int_{r_{sm}}^{r_7} \int_{\delta_i}^{\delta_i+d} A_z^{VII,i} r dr d\theta \qquad (29)$$

The total flux linkage of each phase can be obtained by summing the flux linkages associated with all coil sides of the corresponding phase. The flux over each slot becomes $$\begin{pmatrix} \lambda_a^{VI} \\ A_b^{VI} \\ \lambda_c^{VI} \end{pmatrix} = [C^{VI}][\phi^{VI,1} \phi^{VI,2} \ldots \phi^{VI,Q-1} \phi^{VI,Q}]' \qquad (30)$$

$$\begin{pmatrix} \lambda_a^{VII} \\ A_b^{VII} \\ \lambda_c^{VII} \end{pmatrix} = [C^{VII}][\phi^{VII,1} \phi^{VII,2} \ldots \phi^{VII,Q-1} \phi^{VII,Q}]' \qquad (31)$$

Finally, the flux linkage of the PMSM with a three-phase winding is calculated by adding the flux calculated at each conductor.

$$\begin{pmatrix} \lambda_a \\ \lambda_b \\ \lambda_c \end{pmatrix} = \begin{pmatrix} \lambda_a^{IV} \\ \lambda_b^{IV} \\ \lambda_c^{IV} \end{pmatrix} + \begin{pmatrix} \lambda_a^{V} \\ \lambda_b^{V} \\ \lambda_c^{V} \end{pmatrix} \qquad (32)$$

Back-EMF

The back-EMF is merely a voltage that arises from conductors moving in a magnetic field or from changing magnetic fields. Here, the magnetic field can be represented by a flux linkage. The flux linkage from the given rotor position $\theta_0$ and the current in the stator can be calculated at specific times. Then, the back-EMF is calculated by the derivative of the flux linkage with respect to time. From Faraday's law, the three-phase back-EMF can be calculated by differentiating the time-dependent flux linkage over time.

$$\begin{pmatrix} E_a \\ E_b \\ E_c \end{pmatrix} = -\frac{d}{dt} \begin{pmatrix} \lambda_a \\ \lambda_b \\ \lambda_c \end{pmatrix} \qquad (33)$$

The minus sign is an indication that the EMF is in such a direction as to produce a current whose flux, if added to the original flux, would reduce the magnitude of the EMF. This statement that the induced voltage acts to produce an opposing flux is known as Lenz's law.

Electromagnetic Torque

Electromagnetic phenomena can be explained by the Maxwell equation and the Lorentz force. In physics the Lorentz force (or electromagnetic force) is the combination of electric and magnetic force on a point charge due to electromagnetic fields. The Maxwell stress tensor is a symmetric second-order tensor used in classical electromagnetism to represent the interaction between electromagnetic forces and mechanical momentum. To obtain a more general force description, the Lorentz force can be rewritten using the microscopic Maxwell equation in an equation that is a function of the magnetic field.

$$T_z = r \times F_\theta = \frac{r}{\mu_0} \int_0^{l_{stk}} \int_0^{2\pi} B_{rg} B_{\theta g} r d\theta dz_z = \frac{\pi l_{stk} r^2}{\mu_0} \sum_{n=1}^{\infty} (B_{rc} B_{\theta c} + B_{rs} B_{\theta s}) i_z \qquad (34)$$

where r is the radius of the integration surface, $B_{rg}$ and $B_{\theta g}$ is the radial and tangential component of the flux density at radius r, respectively. By using the magnetic flux density at on-load, electromagnetic torque can be determined.

Aspects of the Present Disclosure

Aspects of the present disclosure show the effectiveness of 2-D subdomain model on the magnetic field distribution in IPMSM. The parameters of the analysis model are listed in Table I. In order to have a good precision in the analytical evaluation, the number of harmonic terms used in the computations is equal to N=100 (air-gap and PM subdomains) and V=M=K=5 (barrier, pole-piece, slots, and slot-opening subdomains). For a given rotor position, the computation time is approximately 1 s with the analytical model whereas the nonlinear FE analysis takes approximately 30 s for a mesh of 45,700 elements.

FIG. 6 is a table illustrating some specification of an analysis model, i.e. parameters in the table correspond to those in FIG. 4, according to some embodiments of the present disclosure.

Figure 7A:
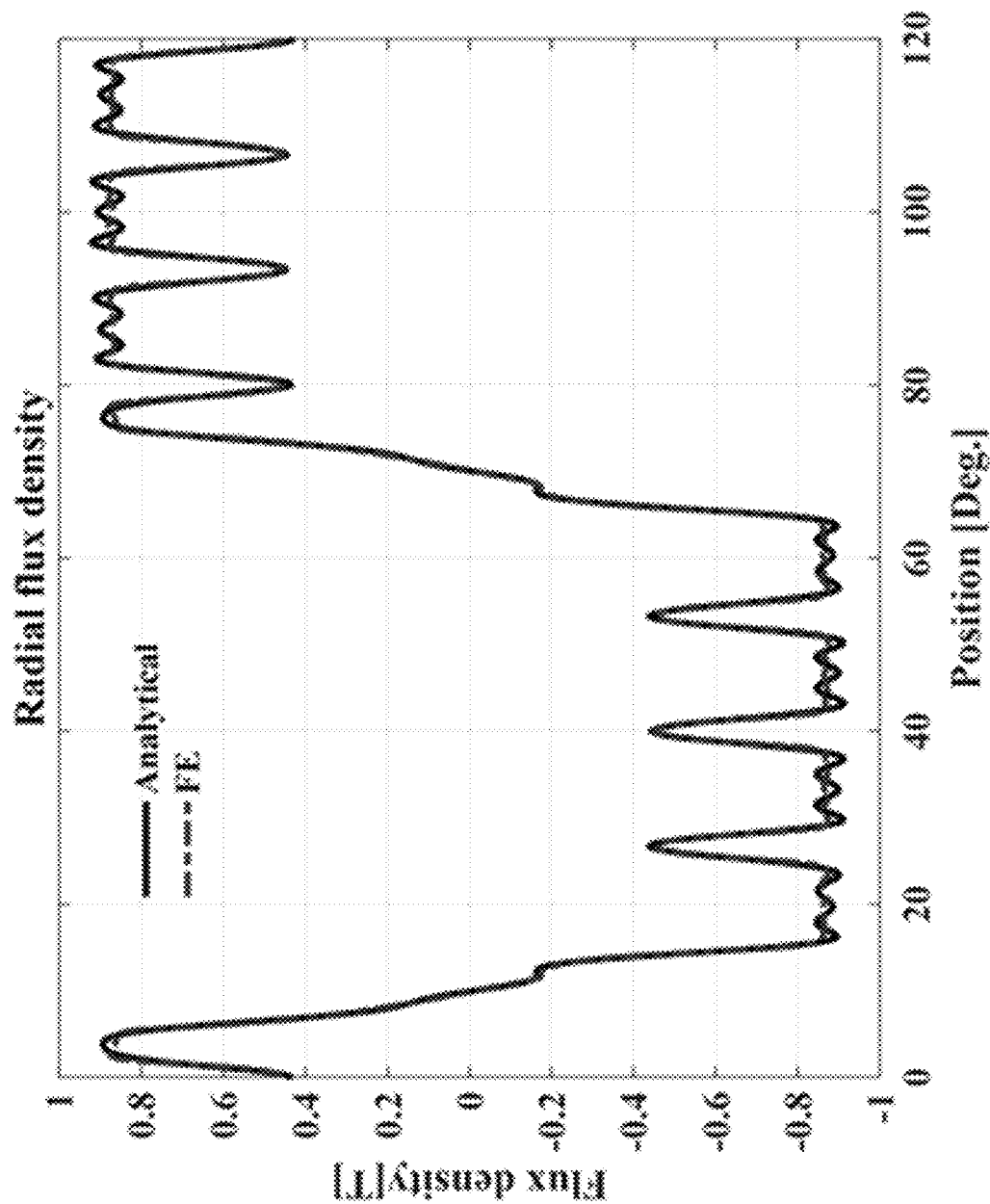
FIG. 7A is a graph illustrating the radial flux density distribution at a center of an air gap, including the normal components of the flux density distribution in the middle of the air gap, according to some embodiments of the present disclosure.

FIG. 7A is a graph illustrating the radial flux density distribution at a center of an air gap, including the normal components of the flux density distribution in the middle of the air gap, according to some embodiments of the present disclosure.

Figure 7B:
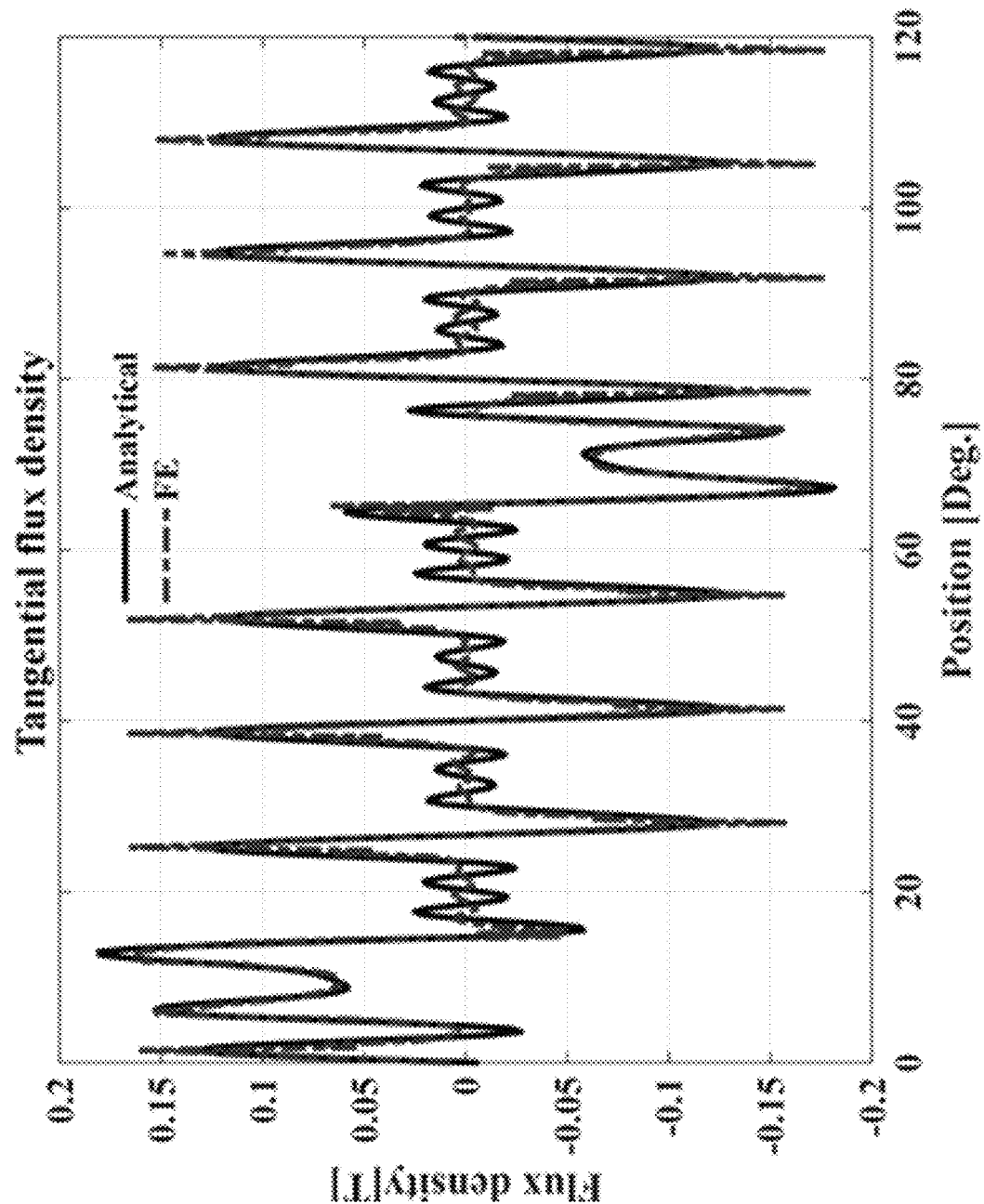
FIG. 7B is a graph illustrating the radial flux density distribution at a center of an air gap, including the tangential components of the flux density distribution in the middle of the air gap, according to some embodiments of the present disclosure.

FIG. 7B is a graph illustrating the radial flux density distribution at a center of an air gap, including the tangential components of the flux density distribution in the middle of the air gap, according to some embodiments of the present disclosure.

Referring to FIG. 7A and FIG. 7B, the normal and tangential components of the flux density distribution in the middle of the air gap are shown in FIG. 7A and FIG. 7B. The results of the analytical model are shown to be consistent with those of the FE model. Thus, the validity of analysis process for the proposed analytical model is verified.

Figure 8:
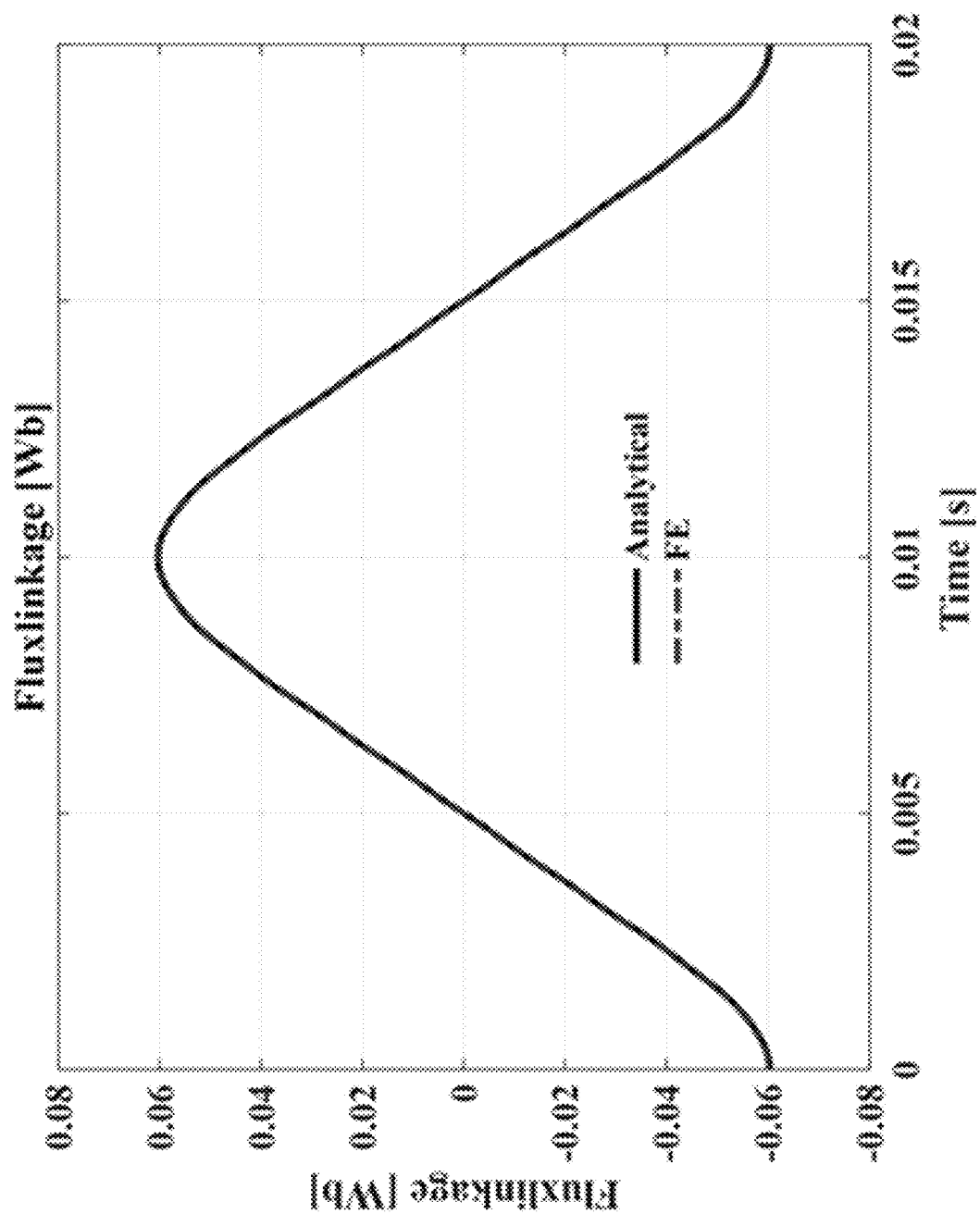
FIG. 8 is a graph illustrating the flux linkage by PM under no-load conditions with a rotor speed about 1000 rpm, wherein the results were obtained for one cycle electrically, according to some embodiments of the present disclosure.

FIG. 8 is a graph illustrating the flux linkage by PM under no-load conditions with a rotor speed about 1000 rpm, wherein the results were obtained for one cycle electrically, according to some embodiments of the present disclosure.

Figure 9:
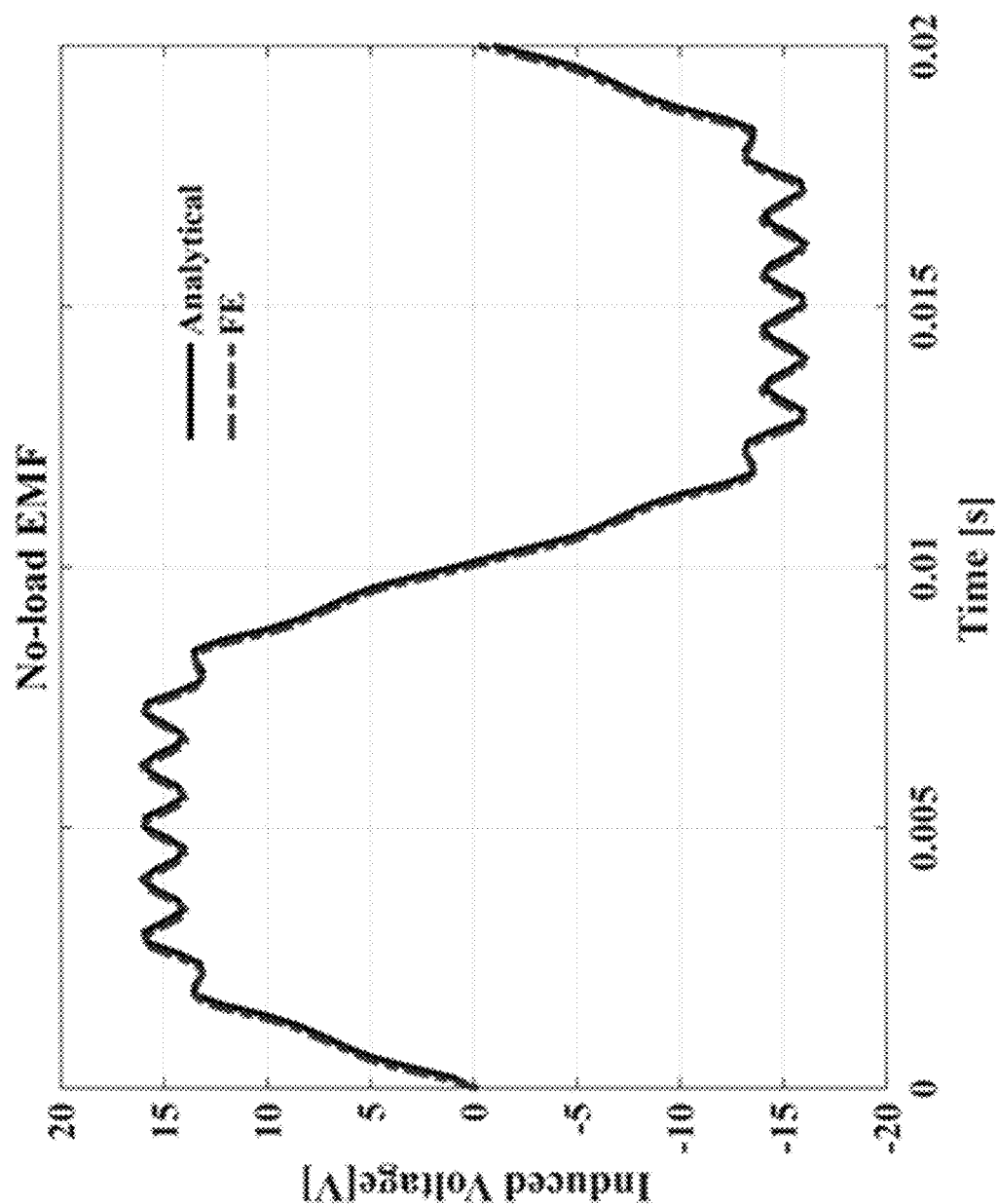
FIG. 9 is a graph illustrating the back-EMF by PM under no-load conditions with a rotor speed about 1000 rpm, wherein the results were obtained for one cycle electrically, according to some embodiments of the present disclosure.

FIG. 9 is a graph illustrating the back-EMF by PM under no-load conditions with a rotor speed about 1000 rpm, wherein the results were obtained for one cycle electrically, according to some embodiments of the present disclosure.

Figure 10:
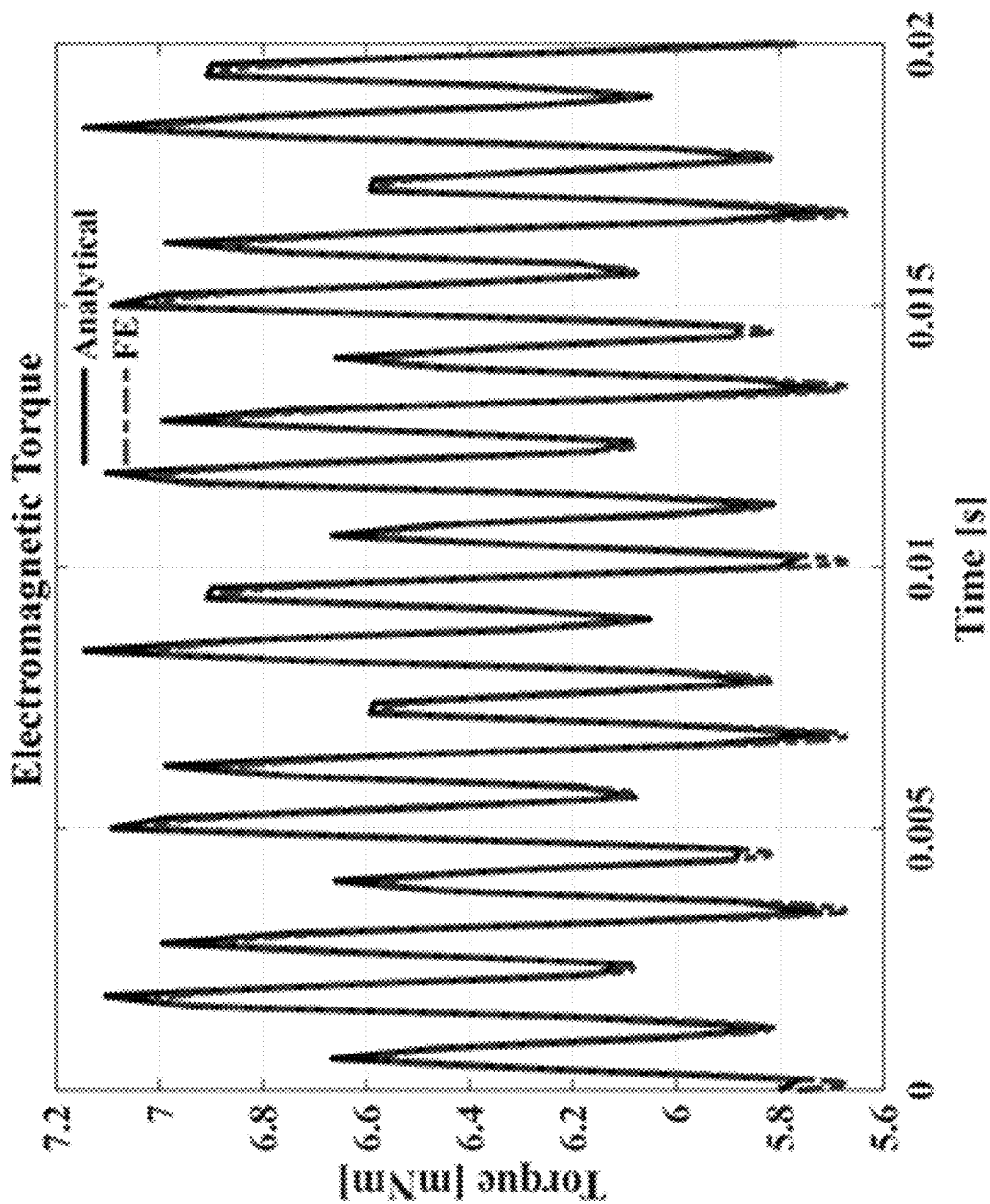
FIG. 10 is a graph illustrating the electromagnetic torque of the IPMS machine with a three phase armature current waveform, according to some embodiments of the present disclosure.

FIG. 10 is a graph illustrating the electromagnetic torque of the IPMS machine with a three phase armature current waveform, according to some embodiments of the present disclosure.

The methods of the present disclosure are capable of analyzing other types of synchronous machines. For example, instead of using permanent magnet as the excitation source in the rotor, wound-field synchronous machine (WFSM) uses field coils in the rotor with DC current injection. When analyzing an IPMS motor, the PM region is considered as a subdomain with excitation source of the magnetization of the PM, and the magnetization is written in the form of a Fourier series. The solution of the governing equation is obtained by considering the excitation source. When analyzing a WFSM machine, the field coil region is considered as a subdomain with excitation source of the coil current, and the current excitation is written in the form of another Fourier series. The solution of the governing equation is obtained by considering the excitation source.

With an IPMS machine, one drawback is that it is difficult to control the air gap magnetic flux, because the magnetic flux is determined by the property of the permanent magnet and is generally considered as constant and cannot be changed easily. Therefore, the efficiency of the machine can be affected as certain operating conditions. On the other hand, with WFSM, controlling the air gap magnetic flux is achieved by simply changing the current injection to the field coils. However, the copper loss of the field winding becomes large at the rated load.

A new type of synchronous machine combines the benefits of both IPMS and WFSM machines, and is called hybrid excitation synchronous machines (HESM). In an HESM, two excitation sources are present in the rotor, that is, both the magnetization of the PM, and the current in field coil in the rotor. The analysis of HESM is more complicated than conventional synchronous machines, due to its complexity in geometrical topology and the multiple excitation sources to deal with. Some embodiments of the present disclosure can be applied to the analysis of an HESM. A subdomain is assigned to the region of rotor with excitation sources, including the PM and the field coils. Each of the excitation source is written in the form of a Fourier series, and the solution of the governing equation for the subdomain is obtained considering both excitation sources.

Figure 11A:
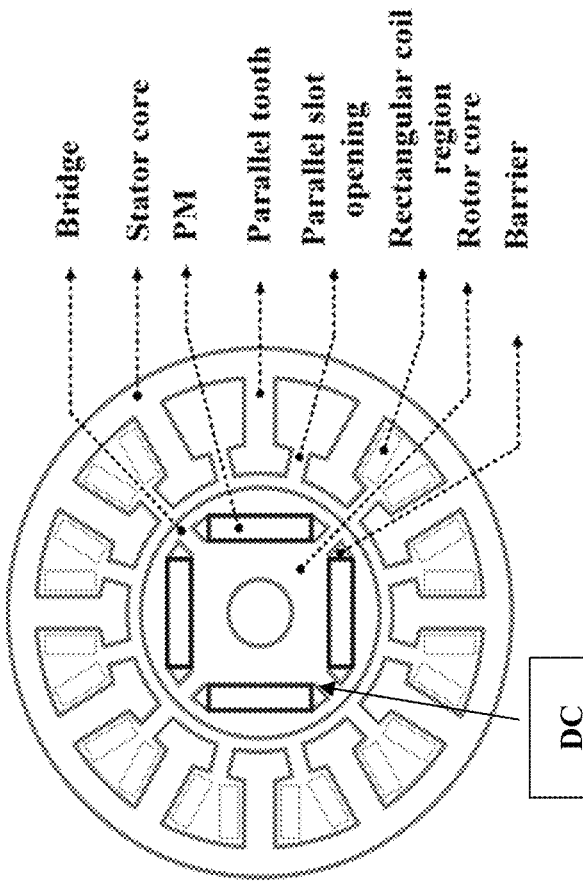
FIG. 11A is a schematic illustrating an actual model for a new type of hybrid excitation synchronous machine design, such that the excitation sources include both permanent magnet (PM) and direct current (DC) field coil in the rotor, according to some embodiments of the present disclosure.

FIG. 11A is a schematic illustrating an actual model for a hybrid excitation synchronous machine design, such that the excitation sources include both permanent magnet (PM) and direct current (DC) field coil defined in the rotor, according to some embodiments of the present disclosure.

Figure 11B:
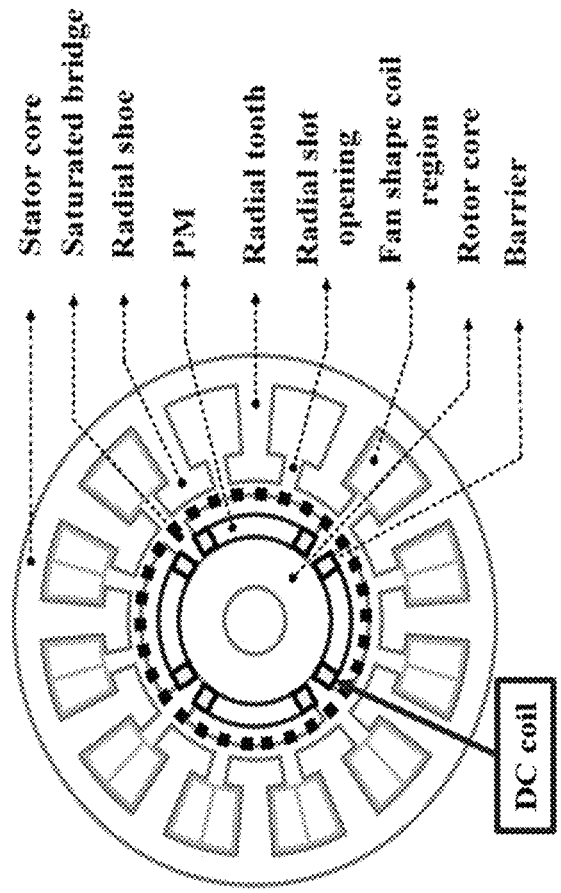
FIG. 11B is a schematic illustrating structures of an analytical model for hybrid excitation synchronous machine design, such that a subdomain or region includes both permanent magnet (PM) and direct current (DC) field coil defined in the rotor, wherein the governing equation for this subdomain includes two source terms, PM magnetization and DC coil current density, according to some embodiments of the present disclosure.

FIG. 11B is a schematic illustrating structures of an analytical model for a hybrid excitation synchronous machine design, such that a subdomain or region includes both permanent magnet (PM) and direct current (DC) field coil defined in the rotor, wherein the governing equation for this subdomain includes two source terms, PM magnetization and DC coil current density, according to some embodiments of the present disclosure.

Figure 12A:
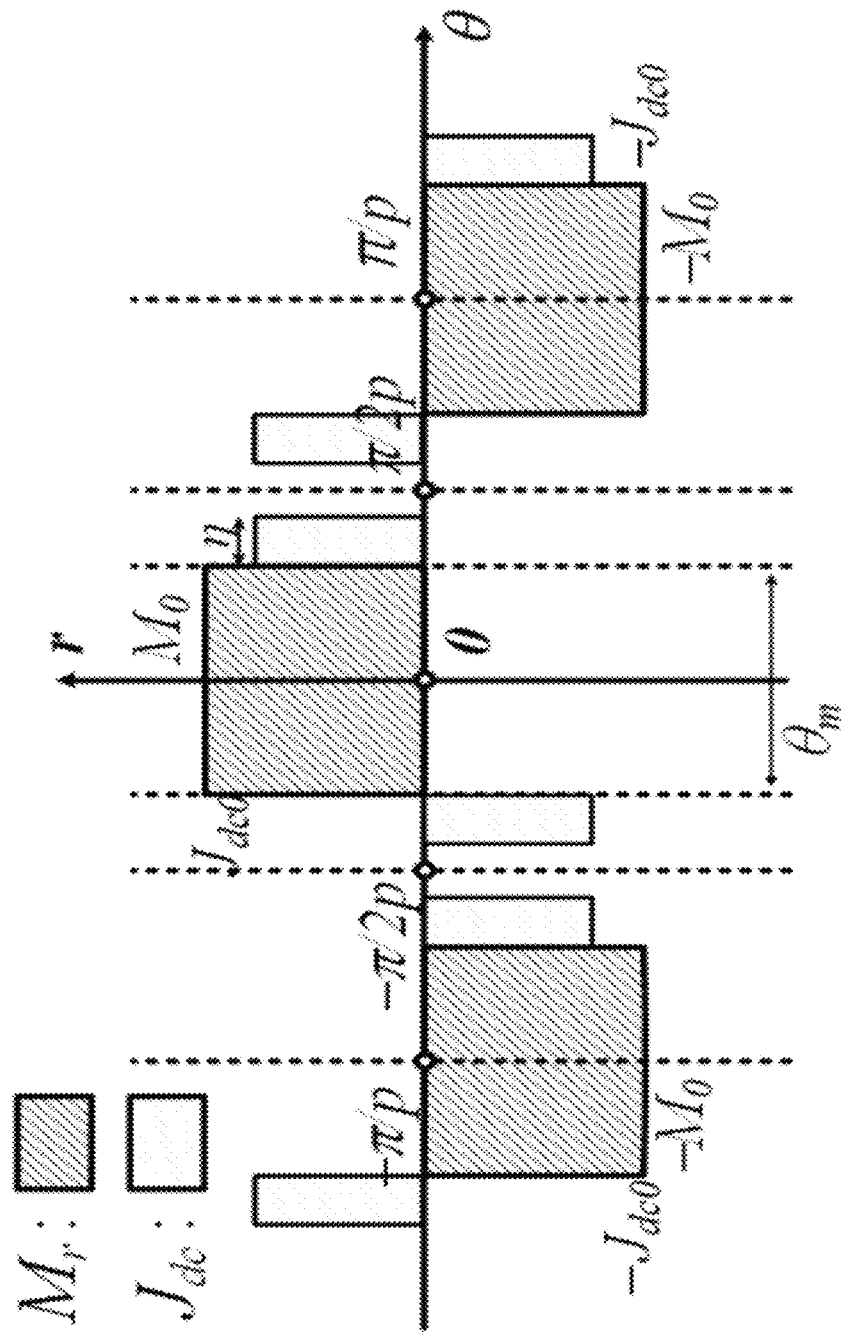
FIG. 12A is a graph illustrating the magnetization and current density in the rotor as function of rotor angle in view of FIG. 11B, according to some embodiments of the present disclosure.
Figure 12B:
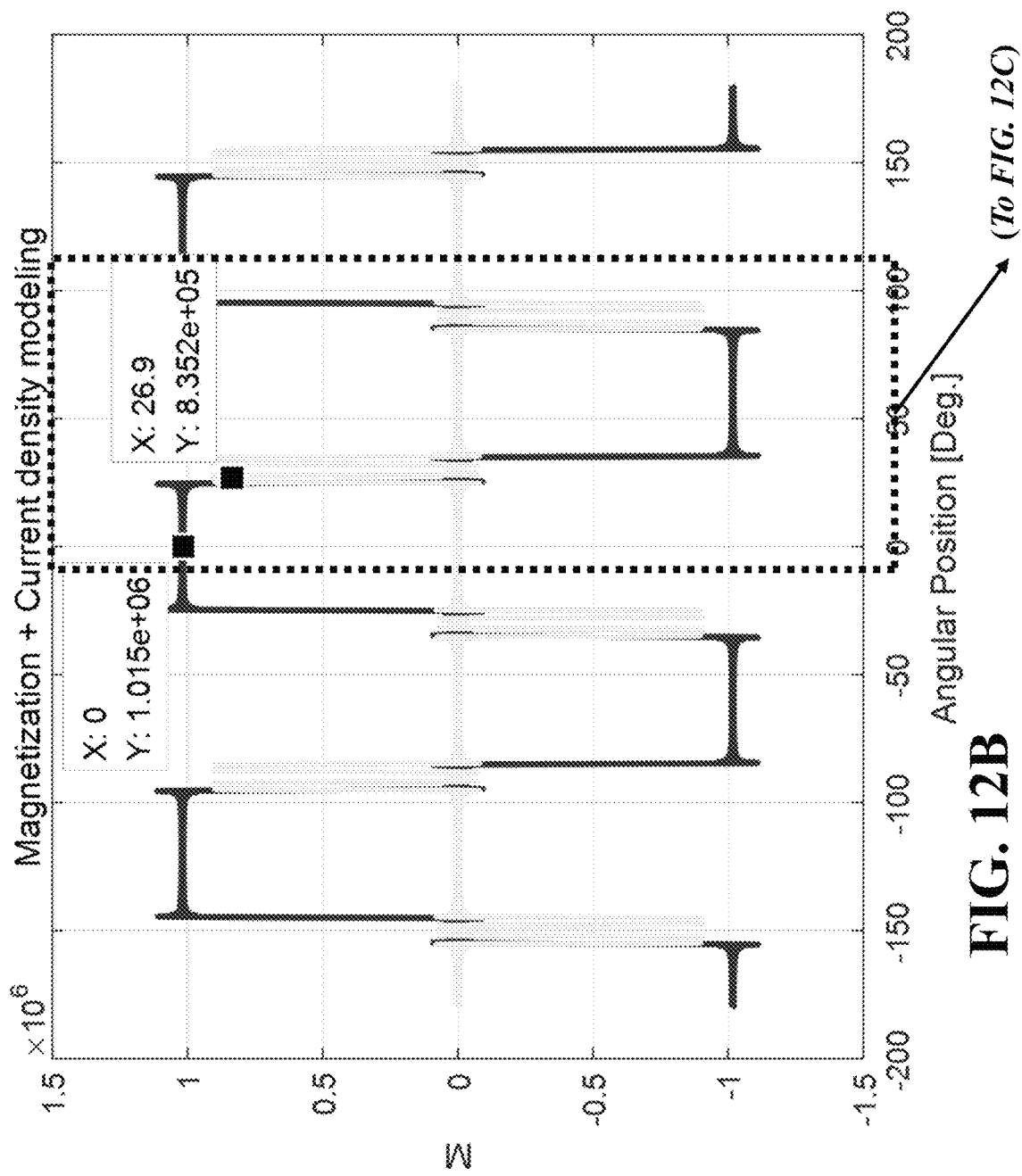
FIG. 12B is a graph illustrating results for modeling magnetization and current density in the rotor as function of rotor angle in view of FIG. 11B, according to some embodiments of the present disclosure.
Figure 12C:
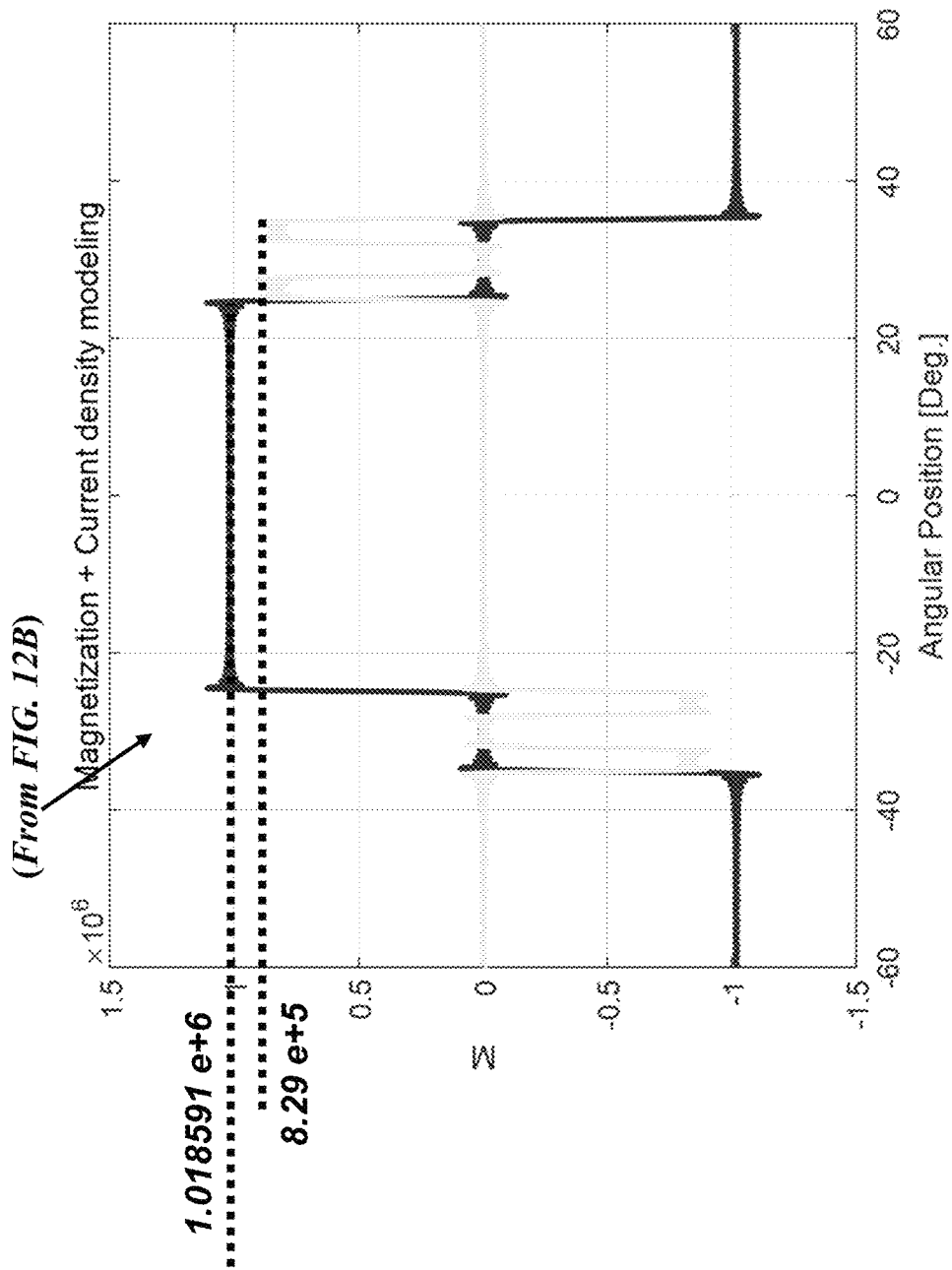
FIG. 12C is a graph illustrating some results for modeling magnetization and current density in the rotor as function of rotor angle in view of FIG. 12B, according to some embodiments of the present disclosure.
Figure 13:
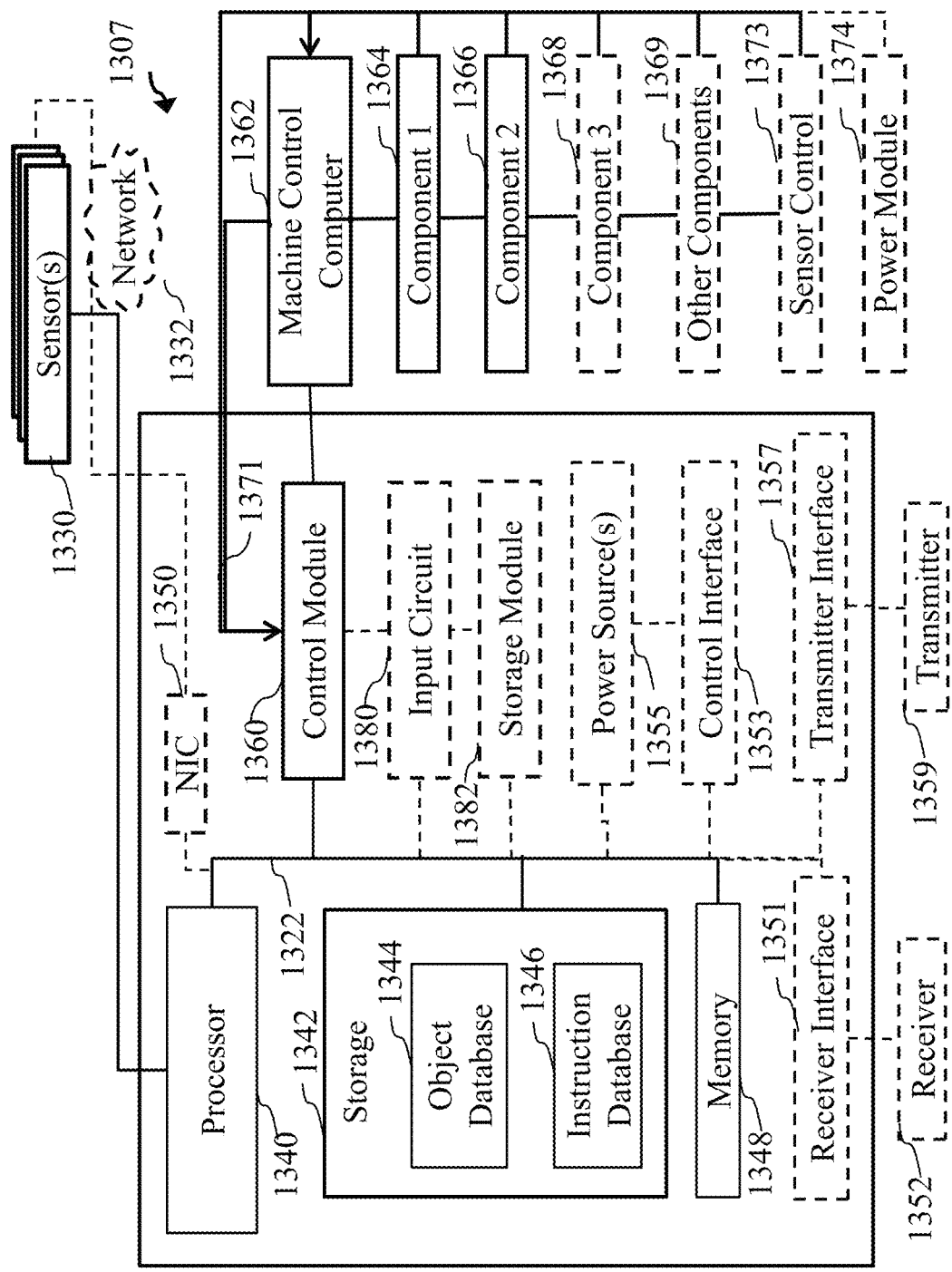
FIG. 13 is a schematic diagram illustrating some components for a processor in communication with a controller system of the PM machine, according to some embodiments of the present disclosure.

FIG. 12A is a graph illustrating the magnetization and current density in the rotor as function of rotor angle in view of FIG. 11B according to some embodiments of the present disclosure;

FIG. 12B is a graph illustrating results for modeling magnetization and current density in the rotor as function of rotor angle in view of FIG. 11B, according to some embodiments of the present disclosure;

FIG. 12C is a graph illustrating some results for modeling magnetization and current density in the rotor as function of rotor angle in view of FIG. 12B, according to some embodiments of the present disclosure;

FIG. 13 is a schematic diagram illustrating some components for a computing system 1307 having a processor 1340 connected to a control system 1362 of a machine (not shown), such as a PM machine or similar type of machine, according to some embodiments of the present disclosure. For example, the processor 1340 can be located approximate the machine (not shown) or within the machine. The processor 1340 can be connected to sensors 1330 located within an environment (not shown) and positioned within a sensing distance of the processor 1240 and the machine (not shown). The sensors 1330 can be cameras, video cameras, speed sensors, light sensors, environmental related sensors (i.e. temperature, humidity, fire, air, water, barometer sensors, etc.), used with the machine (not shown). The sensors 3330 can be hardwired and/or wireless, such that a network 1332 can be within an operating distance range of the sensors 1330.

The processor 1340 is connected to a bus system 1322 that connects to storage 1342. The storage 1342 can include a database 1344, an instruction database 1346, an historical database (not shown), an instruction historical database (not shown), an environmental database (not shown), a machine database (not shown) associated with the operation of the machine, other databases (not shown) can have data related to operation and information usable for optimizing, managing or operating the machine (not shown). Again, depending upon each user/operator's specific operational configurations/structure/special needs/sensitivities of the intended use of the machine, many different configurations are contemplated.

Still referring to FIG. 13, a memory 1348 is connected to the bus system 1322, along with a receiver interface(s) 1351, a receiver(s) 1352 and a power source(s) 1355. The power source(s) 1355 can be connected to the bus system 1322, connected to a control interface 1353, or be configure to have a multitude of other configurations, all of which, is contemplated depending on the specific user/operator intended specific needs for operations. It is possible the power source(s) can be electric, renewable energy sources, chemical, as well as directly connected to the machine, have a multiple external power sources of different types, or both. A transmitter interface(s) 1357 and transmitter(s) 1359 are connected to the bus system 1322. Also, a network interface controller 1350 (NIC, also known as a network interface card, network adapter, LAN adapter or physical network interface, and by similar terms, is a computer hardware component connecting a computer to a computer network) is connected to the bus system 1322 and can be in communication with a network 1332 or other different types of wireless networks (not shown). Again, depending upon the special needs for operation & sensitives needed by a user/operator for their intended use.

A control module(s) 1360 can be connected to the bus system 1322. The control module(s) 1360 can be connected to a machine control computer(s) 1362, that assist in directing components of the machine control computer 1362. Some components can include, by non-limiting example, component 1 1364, component 2 1366, component 3 1368, and other machine related components 1369, which all can be connected to the machine control computer(s) 1362, and/or the control module 1360, via 1371. The control Module 1360 can be configured from the machine control computer 1362 to check a machine component(s) status once, and report back, thereby providing management of the machine, operational optimization/performance along with other related service and monitoring capabilities. Contemplated is that the machine control computer can have a power module 1374, that can include any power source that provides power to the machine (not shown) such as a power adaptor or a rechargeable battery pack depending on the user specific requirements.

Still referring to FIG. 13, the processor 1340 can implement or execute stored instructions that are stored in memory 1348, storage 1342 or access from a cloud storage via the network 1332, in particular, the processor 1340 can access the prestored data including data from the database 1344, the instruction database 1346, or other stored data from other databases (not shown), as noted above.

Still referring to FIG. 13, the machine control computer 1362 provide commands and implement changes to one or more components of the machine associated with aspects of the models of the present disclosure. Contemplated is that the computer system 1307 can include a sensor control 1373 connected to the components 1364, 1366, 1368 of the machine. Also contemplated is that some component sensors (i.e. sensors associated with the machine, or any other components of the machine or associated with components associated with the machine), and other components (not shown) can be utilized. Contemplated is that multiple types of sensors can be located on or in an approximate area of the machine.

The sensor control computer 1373 can include a hardware processor (not shown) connected a memory (not shown) that includes stored software (not shown). The hardware processor (not shown) can implement or execute stored instructions that are stored in memory (not shown), and when any sensor data is received, the received data can be compared to stored data, and send sensor data/signals, such warning messages, a level of performance associated with one or more components of the machine, etc., to the machine control computer 1362 or other components of the machine or computer system 1307. Another aspect of the systems and components of the present embodiments, is that software or hardware, or some combination thereof, can be implemented via localized storage or through a cloud-based system.

Further, the control or controller module 1360 can include different applications and programs for implementing methods of the present disclosure. For example, the control module 1360 can include applications for processing information received from the machine control computer 1362, such as generating graphs, operation related models including 3D models of the environment where the machine is located. The control module 1360 can include applications for interpreting control inputs, or input signals, received via the input circuit/interface module 1380, storage module 1382, and generating commands/actions.

Figure 14:
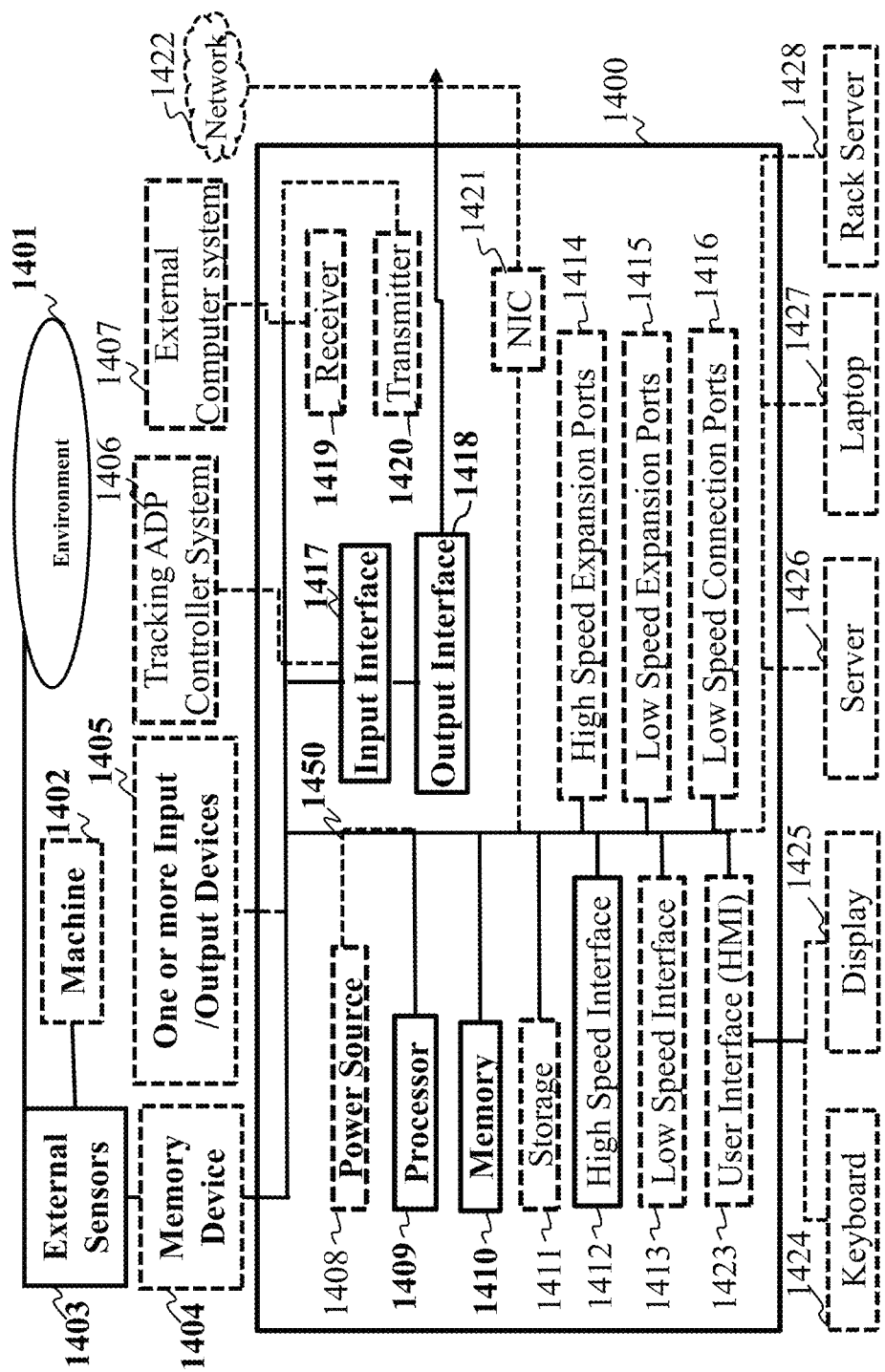
FIG. 14 is a schematic diagram illustrating a centralized controller system that can be used for implementing some systems and methods, according to some embodiments of the present disclosure.

FIG. 14 is a schematic diagram illustrating a centralized controller system that can be used for implementing some methods, or may be combined with the processor of FIG. 13, depending on the specific goals of a user, according to some embodiments of the present disclosure. For example, the centralized controller system can be a computing apparatus that represents various forms of digital computers, such as laptops, desktops, workstations, personal digital assistants, servers, blade servers, mainframes, and other appropriate computers.

The centralized controller system 1400 can include a power source 1408, a processor 1409, a memory 1410, a storage device 1411, all connected to a bus 1450. Further, a high-speed interface 1412, a low-speed interface 1413, high-speed expansion ports 1414 and low speed connection ports 1415, can be connected to the bus 1450. Also, a low-speed expansion port 1416 is in connection with the bus 1450. Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third party imaging device, and/or third-party printing device outside of the computer device 1400.

Contemplated is that the memory 1410 can store instructions that are executable by the centralized controller system 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1110 may also be another form of computer-readable medium, such as a magnetic or optical disk.

Still referring to FIG. 14, a storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumb-drive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above.

The system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others.

Still referring to FIG. 14, the centralized controller system 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter.

Still referring to FIG. 14, the centralized controller system 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components in a mobile device (not shown), such as a mobile computing device having different component configuration arranged for mobile devices.

Features

According to another embodiment of the present disclosure, a system for designing an evaluation of an electromagnetic performance of a permanent magnet (PM) motor. The system including a transceiver to accept parameters for an electromagnetic analysis. A hardware processor in communication with the transceiver and the PM motor, to execute steps of an electromagnetic analytical (EA) model of the PM motor. The steps of the EA model includes updating the EA model with the parameters. Each component of the PM motor is associated with assumptions including some assumptions with a relative permeability of at least one pole-piece region and at least one bridge region of a rotor core modeled as finite, in the EA model. Calculate a general solution to a governing equation to each region of the regions of the PM motor that include unknown coefficients to be determined, based on each region having a set of assumptions, geometry of the PM motor and electrical and magnetic properties of a component of the PM motor. Identify a set of boundary and interface conditions for two neighboring regions of the regions, along with an additional boundary and interface condition between a barrier region and a neighboring pole-piece region that have different permeability values, and that their general solutions are matched at these boundary and interfaces. Calculate all the unknown coefficients in the general solutions in all regions of the PM motor based on solving a linear system of equations obtained from the boundary conditions between the regions, to solve for a magnetic vector potential for the PM motor. Evaluate the electromagnetic performance of the PM motor based on the magnetic vector potential for the PM motor. Wherein the following aspects below are contemplated as configuring a modified embodiment of the above embodiment for one or a combination of the following aspects below.

According to aspects of the present disclosure, the one or more types command actions are associated with an alert including one or a combination of an imminent pending failure of the PM motor, a maintenance action to the PM motor, a design action to the PM motor or an action associated with one or more components of the PM motor associated with performance or maintenance.

Another aspect may be that the magnetic vector potential is used for predicting a flux linkage, such that the flux linkage is based on a magnetic flux that is a product of a magnetic flux density times a perpendicular area that the magnetic flux penetrates.

Another aspect may be that the assumptions include one or a combination of: (a) a relative permeability of steel cores of a stator and a rotor of the PM motor are infinite; (b) a relative permeability of a rotor bridge of the PM motor is constant; (c) the permanent magnets have a same permeability as air which is equal to one; (d) eddy-current effects are neglected; (e) end effects along a z-axis direction along the rotational axis are neglected; or (f) a structure of the stator and the rotor of the PM mother have radial sides.

Another aspect may be that the regions include: region I, a rotor core region; region II, a permanent magnet (PM) region; region III, j-th barrier regions; region VI, j-th pole-piece regions; region V, air-gap regions; region VI, $i^{th}$ slot-opening regions; region VII, i-th bottom slot regions; and region VIII, i-th top slot regions. Wherein the regions I, II, and V have periodic shapes.

Another aspect may be that the magnetic vector potential is used for predicting a flux linkage, such that the flux linkage is based on a magnetic flux that is a product of a magnetic flux density times a perpendicular area that the magnetic flux penetrates. Wherein calculating the flux linkage using the magnetic vector potential is characterized as a line integral of the magnetic vector potential based on Stoke's theorem.

While another aspect may be that the magnetic vector potential is used for predicting a back electromotive force (EMF), such that the back EMF is a voltage that arises from conductors moving in a magnetic field or from changing magnetic fields in the PM motor, and wherein the magnetic field is represented by a flux linkage. Wherein the flux linkage from a given rotor position $\theta_0$ and the current in the stator can be calculated at specific times. Then, the back-EMF is calculated by the derivative of the flux linkage with respect to time. From Faraday's law, the three-phase back-EMF can be calculated by differentiating the time-dependent flux linkage over time. Such that each component of the PM motor include one or more regions.

Another aspect may be that the calculated magnetic vector potential is an electromagnetic performance parameter, that is later used for calculating other electromagnetic performance parameters, such that hybrid excitations of the PM motor performances are calculable using the calculated electromagnetic performance parameters including: (1) an amount of a permeant magnetic excitation with a constant magnetic field, and (2) an amount of a coil excitation having a flexible magnetic field that can be controlled by the coil excitation, and includes an amount of a heating effect.

Definitions of Terms

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Computing system: The computing system can include one or more processors for controlling operation of the computing system, and a memory for storing data and program instructions usable by the one or more processors. It is possible that the computing system can be configured to determine control inputs in accordance with apparatuses, systems and methods of the present disclosure. The computing system may also be configured for revising and/or optimizing one or more control policy usable for controlling a system, and the like. Also contemplated is that the computing system may be incorporated into a machine and configured to update/revise and optimize the control policy directed to controlling operation of the machine. The information (for example, data, instructions, and/or other information) required by the computing system to update/revise and/or optimize the control policy may be received from and/or obtained by any suitable venues, for example, from machine sensors or from other machine resources such as an external databases via a wireless connection. At least some of the information (for example, data) required by the computing system to update/revise and/or optimize the control policy may be provided to the computing system (for example, as data or other information stored in a memory or memories) prior to operation of the machine. The computing system may also be configured to control the machine in accordance with the updated/revised or optimized control policy, to perform the machine operation. The optimized or updated/revised control policy generated by the remote computing system may then be loaded or installed into a machine computing system for deployment with the machine, to control the machine during operation.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Although the present disclosure has been described with reference to certain preferred embodiments, it is to be understood that various other adaptations and modifications can be made within the spirit and scope of the present disclosure.

What is claimed is:

1. A system for designing an evaluation of an electromagnetic performance of a permanent magnet (PM) motor, comprising:
   a transceiver to accept parameters for an electromagnetic analysis;
   a hardware processor in communication with the transceiver and the PM motor, to execute steps of an electromagnetic analytical (EA) model of the PM motor, the steps of the EA model includes
   update the EA model with the parameters, each component of the PM motor is associated with assumptions including some assumptions with a relative permeability of regions associated with a rotor core modeled as finite;
   calculate a general solution to a governing equation to each region of the regions of the PM motor that include unknown coefficients to be determined, based on each region having a set of assumptions, geometry of the PM motor and electrical and magnetic properties of a component of the PM motor, and identify a set of boundary and interface conditions for two neighboring regions of the regions, along with an additional boundary and interface condition between a barrier region and a neighboring pole-piece region that have different permeability values, such that the general solutions to the governing equations of each region including the neighboring regions of the regions, the barrier region, and the neighboring pole-piece region are matched at the set of boundary and interfaces and the additional boundary and interface condition of the barrier region and the neighboring pole-piece region;
   calculate all the unknown coefficients in the general solutions in all regions of the PM motor based on solving a linear system of equations obtained from the boundary conditions between the regions, to solve for a magnetic vector potential for the PM motor;
   evaluate the electromagnetic performance of the PM motor based on the magnetic vector potential for the PM motor; and
   generate one or more type of command actions according to the evaluation of the electromagnetic performance of the PM motor and output the one or more type of command actions to a controller of the PM motor.

2. The system of claim 1, wherein the updating of the EA model with the parameters includes updating a geometry of the PM motor and an electrical and magnetic properties for each component of the PM motor, such that each component is associated with regions of the PM motor.

3. The system of claim 1, wherein each boundary and interface condition is defined on a basis through a set of Maxwell equations using the two neighboring regions sets of assumptions, geometries of the PM motor and electrical and magnetic properties associated with the two neighboring regions, and also identify relationships of the unknown coefficients in the general solutions of the two neighboring regions.

4. The system of claim 1, wherein if the evaluation of the electromagnetic performance of the PM motor is below the operation threshold, one or more type of command actions are generated by the hardware processor and outputted to the controller of the PM motor, and wherein the controller receives the one or more types of command actions via an input interface, and based upon the received one or more type of command actions, the PM motor is either turned off, or continues to operate, and if the evaluation of the electromagnetic performance of the PM motor is above the operation threshold, no type of command action is generated.

5. The system of claim 1, wherein the one or more types command actions are associated with an alert including one or a combination of an imminent pending failure of the PM motor, a maintenance action to the PM motor, a design action to the PM motor or an action associated with one or more components of the PM s motor associated with performance or maintenance.

6. The system of claim 1, wherein the magnetic vector potential is used for predicting a flux linkage, such that the flux linkage is based on a magnetic flux that is a product of a magnetic flux density times a perpendicular area that the magnetic flux penetrates.

7. A system for designing an evaluation of an electromagnetic performance of a permanent magnet (PM) motor, comprising:
- a transceiver to accept parameters for an electromagnetic analysis;
- a hardware processor in communication with the transceiver and the PM motor, to execute steps of an electromagnetic analytical (EA) model of the PM motor, the steps of the EA model includes
- update the EA model by inputting the parameters which updates a geometry of the PM motor and an electrical and magnetic properties for each component of the PM motor, such that each component is associated with regions of the PM motor, and assumptions of the EA model include some assumptions with a relative permeability of regions associated with a rotor core modeled as finite;
- calculate a general solution to a governing equation to each region of the regions of the PM motor that include unknown coefficients to be determined, based on each region having a set of assumptions, geometry of the PM motor and electrical and magnetic properties of a component of the PM motor;
- identifying a set of boundary and interface conditions for two neighboring regions of the regions, each boundary and interface condition is defined on a basis through a set of Maxwell equations using the two neighboring regions sets of assumptions, geometries of the PM motor and electrical and magnetic properties associated with the two neighboring regions, and also identify relationships of the unknown coefficients in the general solutions of the two neighboring regions,
- wherein an additional boundary and interface condition between a barrier region and a neighboring pole-piece region have different permeability values, such that the general solutions to the governing equations of each region including the neighboring regions of the regions, the barrier region, and the neighboring pole-piece region are matched at the set of boundary and interfaces and the additional boundary and interface condition of the barrier region and the neighboring pole-piece region;
- calculate all the unknown coefficients in the general solutions in all regions of the PM motor based on solving a linear system of equations obtained from the boundary conditions between the regions, to solve for a magnetic vector potential for the PM motor, which is used for evaluating the electromagnetic performance of the PM motor; and
- generate one or more type of command actions according to the evaluation of the electromagnetic performance of the PM motor and output the one or more type of command actions to a controller of the PM motor.

8. The system of claim 7, wherein the assumptions include one or a combination of: (a) a relative permeability of steel cores of a stator and a rotor of the PM motor are infinite; (b) a relative permeability of a rotor bridge of the PM motor is constant; (c) the permanent magnets have a same permeability as aft which is equal to one; (d) eddy-current effects are neglected; (e) end effects along a z-axis direction along the rotational axis are neglected; or (f) a structure of the stator and the rotor of the PM mother have radial sides.

9. The system of claim 7, wherein the regions include: region I, a rotor core region; region II, a permanent magnet (PM) region; region III, j-th barrier regions; region VI, j-th pole-piece regions; region V, air-gap regions; region VI, ith slot- opening regions; region VII, i-th bottom slot regions; and region VIII, i-th top slot regions, wherein the regions I, II, and V have periodic shapes.

10. The system of claim 7, wherein the magnetic vector potential is used for predicting a flux linkage, such that the flux linkage is based on a magnetic flux that is a product of a magnetic flux density times a perpendicular area that the magnetic flux penetrates.

11. The method of claim 10, wherein calculating the flux linkage using the magnetic vector potential is characterized as a line integral of the magnetic vector potential based on Stoke's theorem.

12. The method of claim 7, wherein the magnetic vector potential is used for predicting a back electromotive force (EMF), such that the back EMF is a voltage that arises from conductors moving in a magnetic field or from changing magnetic fields in the PM motor, and wherein the magnetic field is represented by a flux linkage.

13. The system of claim 12, wherein the flux linkage from a given rotor position $\theta_0$ and the current in the stator can be calculated at specific times. Then, the back-EMF is calculated by the derivative of the flux linkage with respect to time. From Faradays law, the three-phase back-EMF can be calculated by differentiating the time-dependent flux linkage over time.

14. The system of claim 7, wherein each component of the PM motor include one or more regions.

15. The system of claim 7, wherein the calculated magnetic vector potential is an electromagnetic performance parameter, that is later used for calculating other electromagnetic performance parameters, such that hybrid excitations of the PM motor performances are calculable using the calculated electromagnetic performance parameters including: (1) an amount of a permeant magnetic excitation with a constant magnetic field, and (2) an amount of a coil excitation having a flexible magnetic field that can be controlled by the coil excitation, and includes an amount of a heating effect.

16. A method designing an evaluation of an electromagnetic performance of a permanent magnet (PM) motor, comprising:
- receiving parameters for an electromagnetic analysis from an input interface;
- using a hardware processor to execute steps of an electromagnetic analytical (EA) model for PM motor, the steps of the EA model include
- inputting the parameters into the EA model to updated the EA model, wherein the updating of the EA model include using the parameters to update a geometry of the PM motor and an electrical and magnetic properties of each component of the PM motor, such that each component is associated with one or more regions of the PM motor, wherein assumptions of the EA model include some assumptions with a relative permeability of regions associated with a rotor core modeled as finite;
- calculating a general solution to a governing equation to each region of the one or more regions of the PM motor with unknown coefficients to be determined, based on each region having a set of assumptions, geometry of the PM motor and electrical and magnetic properties of a component of the PM motor;
- defining a set of boundary and interface conditions for two neighboring regions of the one or more regions, each boundary and interface condition is defined on a basis through a set of Maxwell equations, using each region of the two neighboring regions set of assumptions, geometry of the PM motor and electrical and magnetic properties of the two neighboring regions, and identify relationships of the unknown coefficients in the general solutions of the two neighboring regions, wherein an additional boundary and interface condition between a barrier region and a neighboring pole-piece region have different permeability values;

calculating all the unknown coefficients in the general solutions in all regions of the PM motor based on solving a linear system of equations obtained from the boundary conditions between the regions, to solve for a magnetic vector potential for the PM motor used for evaluating the electromagnetic performance of the PM motor, such that the general solutions to the governing equation of each region including the neighboring regions of the regions, the barrier region, and the neighboring pole-piece region are matched at the set of boundary and interfaces and the additional boundary and interface condition of the barrier region and the neighboring pole-piece region; and generating one or more type of command actions according to the evaluation of the electromagnetic performance of the PM motor and outputting the one or more type of command actions to a controller of the PM motor.

17. A non-transitory computer readable storage medium embodied thereon a program executable by a computer for performing a method, the method including designing an evaluation of an electromagnetic performance of a permanent magnet (PM) motor, comprising:

using a hardware processor in communication with a controller of a permanent magnet motor, or the controller, to execute steps of an electromagnetic analytical (EA) model of the motor, the steps of the EA model includes receiving parameters for an electromagnetic analysis;

inputting the parameters into the EA model to updated the EA model, wherein the updating of the EA model includes using the parameters to update a geometry of the PM motor and an electrical and magnetic properties of each component of the PM motor, such that each component is associated with regions of the PM motor, and assumptions of the EA model include some assumptions that relate to a relative permeability of regions associated with a rotor core modeled as finite;

calculating a general solution to a governing equation to each region of the one or more regions of the PM motor with unknown coefficients to be determined, based on each region having a set of assumptions, geometry of the PM motor and electrical and magnetic properties of a component of the PM motor;

defining a set of boundary and interface conditions for two neighboring regions of the one or more regions, each boundary and interface condition is defined on a basis through a set of Maxwell equations, using each region of the two neighboring regions set of assumptions, geometry of the PM motor and electrical and magnetic properties of the two neighboring regions, and identify relationships of the unknown coefficients in the general solutions of the two neighboring regions, wherein an additional boundary and interface condition between a barrier region and a neighboring pole-piece region have different permeability values;

calculating all the unknown coefficients in the general solutions in all regions of the PM motor based on solving a linear system of equations obtained from the boundary conditions between the regions, to solve for an electromagnetic performance parameter including a magnetic vector potential for the PM motor, that is later used for calculating other electromagnetic performance parameters, such that the general solutions to the governing equation of each region including the neighboring regions of the regions, the barrier region, and the neighboring pole-piece region are matched at the set of boundary and interfaces and the additional boundary and interface condition of the barrier region and the neighboring pole-piece region;

accessing standard electromagnetic performance parameters prestored in a memory of the hardware processer or the controller, the hardware processor or the controller comparing the calculated electromagnetic performance parameters with the standard electromagnetic performance parameters, and obtaining an evaluating result of the electromagnetic performance of the PM motor; and generating one or more type of command actions according to the evaluation of the electromagnetic performance of the PM motor and outputting the one or more type of command actions to the controller of the PM motor.

18. A system for designing an evaluation of an electromagnetic performance of a permanent magnet (PM) motor, comprising:

a transceiver to accept parameters for an electromagnetic analysis;

a hardware processor in communication with the transceiver and the PM motor, to execute steps of an electromagnetic analytical (EA) model of the PM motor, the steps of the EA model includes update the EA model with the parameters, each component of the PM motor is associated with assumptions including some assumptions with a relative permeability of at least one pole-piece region and at least one bridge region of a rotor core modeled as finite;

calculate a general solution to a governing equation to each region of the regions of the PM motor that include unknown coefficients to be determined, based on each region having a set of assumptions, geometry of the PM motor and electrical and magnetic properties of a component of the PM motor;

identify a set of boundary and interface conditions for two neighboring regions of the regions, along with an additional boundary and interface condition between a barrier region and a neighboring pole-piece region that have different permeability values; and calculate all the unknown coefficients in the general solutions in all regions of the PM motor based on solving a linear system of equations obtained from the boundary conditions between the regions, to solve for a magnetic vector potential for the PM motor, such that the general solutions to the governing equation of each region including the neighboring regions of the regions, the barrier region, and the neighboring pole-piece region are matched at the set of boundary and interfaces and the additional boundary and interface condition of the barrier region and the neighboring pole-piece region;

evaluate the electromagnetic performance of the PM motor based on the magnetic vector potential for the PM motor; and generate one or more type of command actions according to the evaluation of the electromagnetic performance of the PM motor and output the one or more type of command actions to a controller of the PM motor.

\* \* \* \* \*